US008504992B2

(12) United States Patent
Weber et al.

(10) Patent No.: US 8,504,992 B2
(45) Date of Patent: *Aug. 6, 2013

(54) METHOD AND APPARATUS FOR ESTABLISHING A QUALITY OF SERVICE MODEL

(75) Inventors: Wolf-Dietrich Weber, San Jose, CA (US); Chien-Chun Chou, Saratoga, CA (US); Drew E. Wingard, Palo Alto, CA (US)

(73) Assignee: Sonics, Inc., Milpitas, CA (US)

( * ) Notice: Subject to any disclaimer, the term of this patent is extended or adjusted under 35 U.S.C. 154(b) by 205 days.

This patent is subject to a terminal disclaimer.

(21) Appl. No.: 12/706,656

(22) Filed: Feb. 16, 2010

(65) Prior Publication Data

US 2010/0211935 A1    Aug. 19, 2010

Related U.S. Application Data

(63) Continuation-in-part of application No. 10/698,905, filed on Oct. 31, 2003, now Pat. No. 7,665,069, and a continuation-in-part of application No. 12/144,883, filed on Jun. 24, 2008, and a continuation-in-part of application No. 11/203,554, filed on Aug. 11, 2005.

(60) Provisional application No. 60/946,096, filed on Jun. 25, 2007, provisional application No. 60/601,519, filed on Aug. 12, 2004.

(51) Int. Cl.
*G06F 9/44* (2006.01)
*G06F 15/173* (2006.01)
*G06F 13/00* (2006.01)
*H04L 12/28* (2006.01)

(52) U.S. Cl.
USPC ....... 717/127; 709/223; 370/395.21; 711/169

(58) Field of Classification Search
USPC .......................................... 717/127
See application file for complete search history.

(56) References Cited

U.S. PATENT DOCUMENTS 4,375,097 A * 2/1983 Ulug .............................. 370/400
4,393,470 A * 7/1983 Miard .............................. 710/15
(Continued)

FOREIGN PATENT DOCUMENTS
JP    5-12011    1/1993
JP    11-191075    7/1999
(Continued)

OTHER PUBLICATIONS

Hui Zhang, "Service disciplines for guaranteed performance service in packet-switching networks," Proceedings of the IEEE, vol. 83, No. 10, pp. 1374-1396, Oct. 1995, doi: 10.1109/5.469298.*

(Continued)

*Primary Examiner* — James D Rutten
(74) *Attorney, Agent, or Firm* — Rutan & Tucker, LLP

(57) ABSTRACT

In general, methods and apparatus for implementing a Quality of Service (QoS) model are disclosed. A Quality of Service (QoS) contract with an initiating network device may be satisfied. A request may be received from the initiating network device in a first time less than or equal to an ordinal number times an arrival interval. The ordinal number signifies a position of the request among a group of requests. The request that has been serviced may be returned to the initiator in a second time less than or equal to a constant term plus the ordinal number times a service interval.

20 Claims, 10 Drawing Sheets

U.S. PATENT DOCUMENTS

| | | | |
|---|---|---|---|
| 4,476,498 A | 10/1984 | Sheean | |
| 4,688,188 A | 8/1987 | Washington | |
| 5,107,257 A | 4/1992 | Fukuda | |
| 5,218,456 A | 6/1993 | Stegbauer et al. | |
| 5,265,257 A | 11/1993 | Simcoe et al. | |
| 5,274,769 A | 12/1993 | Ishida | |
| 5,287,464 A | 2/1994 | Kumar et al. | |
| 5,363,484 A | 11/1994 | Desnoyers et al. | |
| 5,379,379 A | 1/1995 | Becker et al. | |
| 5,440,752 A * | 8/1995 | Lentz et al. | 710/123 |
| 5,469,433 A | 11/1995 | McAuley | |
| 5,469,473 A | 11/1995 | McClear et al. | |
| 5,530,901 A | 6/1996 | Nitta | |
| 5,546,546 A | 8/1996 | Bell et al. | |
| 5,557,754 A | 9/1996 | Sone et al. | |
| 5,634,006 A | 5/1997 | Baugher et al. | |
| 5,664,153 A | 9/1997 | Farrell | |
| 5,673,416 A | 9/1997 | Chee et al. | |
| 5,708,659 A | 1/1998 | Rostoker et al. | |
| 5,745,913 A | 4/1998 | Pattin et al. | |
| 5,748,629 A | 5/1998 | Caldara et al. | |
| 5,809,538 A | 9/1998 | Pollmann et al. | |
| 5,872,773 A * | 2/1999 | Katzela et al. | 370/256 |
| 5,917,804 A | 6/1999 | Shah et al. | |
| 5,926,649 A | 7/1999 | Ma et al. | |
| 5,948,089 A | 9/1999 | Wingard et al. | |
| 5,982,780 A | 11/1999 | Bohm et al. | |
| 5,996,037 A | 11/1999 | Emnett | |
| 6,023,720 A | 2/2000 | Aref et al. | |
| 6,092,137 A | 7/2000 | Huang et al. | |
| 6,104,690 A | 8/2000 | Feldman et al. | |
| 6,105,094 A | 8/2000 | Lindeman | |
| 6,119,183 A | 9/2000 | Briel et al. | |
| 6,122,690 A | 9/2000 | Nannetti et al. | |
| 6,141,355 A | 10/2000 | Palmer et al. | |
| 6,141,713 A | 10/2000 | Kang | |
| 6,167,445 A | 12/2000 | Gai et al. | |
| 6,182,183 B1 | 1/2001 | Wingard et al. | |
| 6,198,724 B1 | 3/2001 | Lam et al. | |
| 6,199,131 B1 | 3/2001 | Melo et al. | |
| 6,212,611 B1 | 4/2001 | Nizar et al. | |
| 6,215,789 B1 | 4/2001 | Keenan et al. | |
| 6,215,797 B1 | 4/2001 | Fellman et al. | |
| 6,249,144 B1 | 6/2001 | Agrawal et al. | |
| 6,253,269 B1 | 6/2001 | Cranston et al. | |
| 6,266,718 B1 | 7/2001 | Klein | |
| 6,330,225 B1 | 12/2001 | Weber et al. | |
| 6,335,932 B2 | 1/2002 | Kadambi et al. | |
| 6,363,445 B1 | 3/2002 | Jeddeloh | |
| 6,393,500 B1 | 5/2002 | Thekkath | |
| 6,430,156 B1 | 8/2002 | Park et al. | |
| 6,466,825 B1 | 10/2002 | Wang et al. | |
| 6,499,090 B1 | 12/2002 | Hill et al. | |
| 6,510,497 B1 | 1/2003 | Strongin et al. | |
| RE37,980 E | 2/2003 | Elkhoury et al. | |
| 6,526,462 B1 | 2/2003 | Elabd | |
| 6,530,007 B2 | 3/2003 | Olarig et al. | |
| 6,578,117 B2 | 6/2003 | Weber | |
| 6,628,609 B2 | 9/2003 | Chapman et al. | |
| 6,636,482 B2 | 10/2003 | Cloonan et al. | |
| 6,678,645 B1 | 1/2004 | Rajsuman et al. | |
| 6,683,474 B2 | 1/2004 | Ebert et al. | |
| 6,721,325 B1 | 4/2004 | Duckering et al. | |
| 6,725,313 B1 | 4/2004 | Wingard et al. | |
| 6,785,753 B2 | 8/2004 | Weber et al. | |
| 6,804,738 B2 | 10/2004 | Weber | |
| 6,804,757 B2 | 10/2004 | Weber | |
| 6,816,814 B2 | 11/2004 | Ebert et al. | |
| 6,862,265 B1 | 3/2005 | Appala et al. | |
| 6,874,039 B2 | 3/2005 | Ganapathy et al. | |
| 6,877,076 B1 | 4/2005 | Cho et al. | |
| 6,880,133 B2 | 4/2005 | Meyer et al. | |
| 6,882,966 B2 | 4/2005 | Ryu et al. | |
| 6,976,106 B2 | 12/2005 | Tomlinson et al. | |
| 7,050,958 B1 | 5/2006 | Bortfield et al. | |
| 7,062,423 B1 | 6/2006 | Sheredy | |
| 7,116,131 B1 | 10/2006 | Chirania et al. | |
| 7,120,712 B2 | 10/2006 | Wingard et al. | |
| 7,149,829 B2 | 12/2006 | Weber et al. | |
| 7,155,554 B2 | 12/2006 | Vinogradov et al. | |
| 7,191,273 B2 | 3/2007 | Weber | |
| 7,194,561 B2 | 3/2007 | Weber | |
| 7,194,566 B2 | 3/2007 | Wingard et al. | |
| 7,194,658 B2 | 3/2007 | Staton et al. | |
| 7,254,603 B2 | 8/2007 | Weber et al. | |
| 7,266,786 B2 | 9/2007 | Chou et al. | |
| 7,277,975 B2 | 10/2007 | Vinogradov et al. | |
| 7,296,105 B2 | 11/2007 | Weber et al. | |
| 7,299,155 B2 | 11/2007 | Ebert et al. | |
| 7,302,691 B2 | 11/2007 | Masri et al. | |
| 7,325,221 B1 | 1/2008 | Wingard et al. | |
| 7,356,633 B2 | 4/2008 | Weber et al. | |
| 7,543,088 B2 | 6/2009 | Weber et al. | |
| 7,543,093 B2 | 6/2009 | Chou et al. | |
| 7,552,292 B2 | 6/2009 | Hsieh et al. | |
| 7,587,535 B2 | 9/2009 | Sawai | |
| 7,665,069 B2 | 2/2010 | Weber | |
| 7,852,343 B2 | 12/2010 | Tanaka et al. | |
| 7,899,953 B2 | 3/2011 | Inoue | |
| 2001/0026535 A1 | 10/2001 | Amou et al. | |
| 2002/0038397 A1 | 3/2002 | Singh et al. | |
| 2002/0129173 A1 | 9/2002 | Weber et al. | |
| 2002/0129210 A1 | 9/2002 | Arimilli et al. | |
| 2002/0138687 A1 | 9/2002 | Yang et al. | |
| 2002/0152297 A1 | 10/2002 | Lebourg et al. | |
| 2002/0174227 A1 | 11/2002 | Hartsell et al. | |
| 2003/0004699 A1 | 1/2003 | Choi et al. | |
| 2003/0074519 A1 | 4/2003 | Weber | |
| 2003/0074520 A1 | 4/2003 | Weber | |
| 2003/0079080 A1 | 4/2003 | DeMoney | |
| 2003/0208614 A1 * | 11/2003 | Wilkes | 709/232 |
| 2004/0153928 A1 | 8/2004 | Rohrbaugh et al. | |
| 2004/0177186 A1 | 9/2004 | Wingard et al. | |
| 2005/0144585 A1 | 6/2005 | Daw et al. | |
| 2005/0210164 A1 | 9/2005 | Weber et al. | |
| 2006/0218315 A1 | 9/2006 | Okajima et al. | |
| 2006/0225015 A1 | 10/2006 | Synek et al. | |
| 2006/0242525 A1 | 10/2006 | Hollander et al. | |
| 2007/0083830 A1 | 4/2007 | Hamilton et al. | |
| 2007/0094429 A1 | 4/2007 | Wingard et al. | |
| 2008/0086577 A1 | 4/2008 | Huang | |
| 2008/0320268 A1 | 12/2008 | Wingard et al. | |

FOREIGN PATENT DOCUMENTS

| | | |
|---|---|---|
| JP | H11-250004 | 9/1999 |
| JP | 2000-250853 | 9/2000 |
| WO | WO00/29956 | 5/2000 |
| WO | WO01/75620 | 10/2001 |
| WO | WO 0193477 A1 * | 12/2001 |
| WO | WO03/034242 | 4/2003 |
| WO | WO2005/045727 | 5/2005 |
| WO | WO2009/002998 | 12/2008 |

OTHER PUBLICATIONS

"IEEE 100: The Authoritative Dictionary of IEEE Standards Terms", 2000, IEEE , 7$^{th}$ Edition, IEEE Std 100-2000, pp. 570 and 693.*

Reisslein et al., "A Framework for Guaranteeing Statistical QoS", In IEEE/ACM Transactions on Networking, vol. 10, No. 1, Feb. 2002, pp. 27-42, 16 pages.

Stiliadis et al., "Latency-Rate Servers: A General Model for Analysis of Traffic Scheduling Algorithms", In Proceedings of IEEE Infocom 96, Apr. 1996, pp. 111-119, 9 pages.

Goossens et al., "Networks on Silicon: Combining Best-Effort and Guaranteed Services", In Proceeding of 2002 Design, 3 pages.

Rijpkema et al., "Trade Offs in the Design of a Router with Both Guaranteed and Best-Effort Services for Networks on Chip", In Proceedings of Design Automation and Test Conference in Europe, Mar. 2003, 6 pages.

K. Lahiri, et al., "LOTTERYBUS: A New High-Performance Communication Architecture for System-on-Chip Designs". In Proceedings of Design Automation Conference 2003, Las Vegas, Jun. 2001, pp. 15-20, 6 pages.

William J. Dally, "Virtual-channel Flow Control",In Proceedings of the 17th Int. Symp. on Computer Architecture, ACM SIGARCH, May 1990, vol. 18, No. 2, pp. 60-68, 9 pages.

Drew Wingard, et al., "Integration Architecture for System-on-aChip Design", In Proc. of the 1998 Custom Integrated Circuits Conference, May 1998, pp. 85-88, 4 pages.
Axel Jantsch, et al., "Networks on Chip", Kluwer Academic Publishers, 2003. Cover, Title Page, Contents, (4 pp.) Chapters 1-5, (pp. 3-106,) Chapters 7-8, (pp. 131-172) & Chapter 10, (pp. 193-213), 170 pages.
Weber, Wolf-Dietrich, et al., "Enabling Reuse via an IP Core-centric Communications Protocol: Open Core Protocol", In Proceedings of the IP 2000 System-on-Chip Conference Mar. 2000, pp. 1-5.
Communication relating to the results of the Partial International Search, PCTIUS2004/035863, mailing date Jun. 9, 2005, pp. 1 total.
Adan et al., "Queueing Models and some Fundamental Relations", Chapter 3, XP-002329104, Feb. 14, 2001, pp. 23-27.
Leslie Lamport, "How to Make a Multiprocessor Computer that Correctly Executes Multiprocess Programs", XP-009029909, IEEE Transactions on Computers, vol. C-28, No. 9, Sep. 1979, pp. 690-691.
Rixner, Scott et al., "MemoryAccess Scheduling", to appear in ISCA27 (2000), Computer Systems Laboratory, Stanford University, Stanford, CA 94305 pp. 1-11.
Rixner, et al., "A Bandwidth-Efficient Architecture for Media Processing", Micro-31, (1998), pp. 1-11.
Wingard, Drew, "Tiles—An Architectural Abstraction for Platform-Based Design," Perspective article 2, EDAVision, Jun. 2002, 3 pages, www.edavision.com.
"Open Core Protocol Specification," OCP International Partnership, Release 1.0, 2001, 2 pgs.
Wingard, Drew PhD., "Integrating Semiconductor IP Using uNetworks," ASIC Design, Jul. 2000 electronic engineering, 3 pages.
Chou, Joe, "System-Level Design Using OCP Based Transaction-Level Models," presentation, Denali MemCom Taiwan 2005, OCP International Partnership, 23 pages.
Casini, Phil, "Measuring the Value of Third Party Interconnects," Sonics, Inc., White Paper, 2005, 11 pages, www.sonicsinc.com.
Search Report for PCT/US02/05288, mailed May 20, 2002, 1 page.
Search Report for PCT/US02/05438, mailed May 24, 2002, 1 page.
Search Report for PCT/US02/05439, mailed Jun. 26, 2002, 1 page.
Search Report for PCT/US02/05287, mailed Jul. 11, 2002, 2 pages.
European Search Report for International Application No. EP 02 70 7854, mailed on Nov. 30, 2004, pp. 3 total.
European Search Report for International Application No. EP 02 71 3653, mailed on May 29, 2006, pp. 3 total.
First Exam Report for European Application No. 04796678.3 dated Dec. 11, 2006, 6 pages.
Second Exam Report for European Application No. 04796678.3 dated Dec. 14, 2007, 4 pages.
Third Exam Report for European Application No. 04796678.3 dated Mar. 27, 2009, 4 pages.
International Search Report for International Patent Application No. PCT/US2004/035863 dated Aug. 9, 2005, 7 pages.
International Preliminary Report on Patentability and Written Opinion for International Patent Application No. PCTIUS2004/035863 dated May 1, 2006, 11 pages.
PCT International Search Report and Written Opinion, International Application No. PCT/US08/068107, 7 pgs, mailed Oct. 8, 2008.
PCT International Preliminary Report on Patentability, International Application No. PCT/US08/068107, 6 pgs, mailed Jan. 5, 2010.
Non-Final Office Action for U.S. Appl. No. 10/698,905 mailed Mar. 26, 2009, 28 pages.
Non-Final Office Action for U.S. Appl. No. 11/203,554 mailed Feb. 13, 2008, 13 pages.
Final Office Action for U.S. Appl. No. 11/203,554 mailed Sep. 16, 2008, 11 pages.
Advisory Action for U.S. Appl. No. 11/203,554 mailed Feb. 24, 2009, 3 pages.
Office Action for Japanese Patent Application No. 2006-538262 dated Dec. 21, 2010, 3 pages.
Office Action for Japanese Patent Application No. 2006-538262 dated Jan. 31, 2012, 16 pages.
Office Action for Korean Patent Application No. 2006-7010659 dated Feb. 16, 2011, 8 pages.
Office Action for Korean Patent Application No. 2006-7010659 dated Oct. 18, 2011, 6 pages.
U.S. Appl. No. 11/203,554, filed Aug. 11, 2005, Chou et al.
Cross Reference to Related Applications Under 37 C.F.R. § 1.78, 2 pages, Jul. 1, 2011.
Ahn, Jung Ho et al, The Design Space of Data-Parallel Memory Systems, IEEE, 12 pages, Nov. 2006.
Intel Dual-Channel DDR Memory Architecture White Paper informational brochure, Infineon Technologies North America Corporation and Kingston Technology, Company, Inc., 14 pages, Sep. 2003.
OCP (Open Core Protocol) Specification, Release 2.0, OCP International Partnership, OCP-IP Association, 210 pages, 2003.
Weber, Wolf-Dietrich et. al, A Quality-of-Service Mechanism for Interconnection Networks in System-on-Chips, 1530-1591/05, IEEE, 6 pages, 2005.
Weber, Wolf-Dietrich, Efficient Shared DRAM Subsystems for SOCs, Sonics, Inc, Systems on the ICs, pp. 6 pages, 2001.
Wingard, Drew, A Non-Blocking Intelligent Interconnect for AMBA-Connected SoCs, Sonics, Inc., CoWare Arm Developer's Conference, 39 pages, Oct. 6, 2005.
Wingard, Drew, Socket-based Design Using Decoupled Interconnects, Interconnect-Centric Design for Advanced SOC and NOC, 30 pages, 2002.
Wingard, Drew, Sonics SOC Integration Architecture presentation, Systems-ON-ICS, 25 pages, Jan. 28, 1999.
Wingard, Drew, Tiles: the Heterogeneous Processing Abstraction for MPSoc presentation, Sonics, Smart Interconnect IP, 35 pages, Jul. 7, 2004.
G Maruccia et al., "OCCN On-Chip-Communication-Network" From On-Chip bus to Network-on-Chip, a unique modeling framework, Advanced System Technology STMicroelectronics, Jun. 7, 2004, pp. 12.
Bakr Younis et al., "Operating System for Switched Analog Mixed-Signal Circuits", The Ohio State University Department of Electrical and Computer Engineering Design Automation Research Lab (DARL), Jun. 7, 2004, pp. 12.
Richard Ruigrok, "Hardware-Software Co-Simulation with System C", Qualcomm Incorporated, Jun. 7, 2004, pp. 17.
"1$^{st}$ NASCUG Meeting", Meeting Presentations, http:\\www.nascug.org/nascug2004_spring.html North American SystemC Users Group, Jun. 7, 2004, pp. 2.
Cottrell, Donald, Chapter 78: "Design Automation Technology Roadmap", The VLSI Handbook, Copyright 2000, 41 Pages.
Gupta, Sumit and Gupta, Rajesh K., Chapter 64: "ASIC Design", The VLSI Handbook, Copyright 2000, 29 pages.
Hurst, Stanley L., Chapter 5: "Computer Aided Design", VLSI Custom Microelectronics: Digital, Analog, and Mixed-Signal, Copyright 1999, 95 pages.
United States Patent & Trademark Office, memo from Love, John J., Deputy Commissioner for Patent Examination Policy, entitled, "Clarification of Interim Guidelines for Examination of Patent Applications for Subject Matter Eligibility", Apr. 12, 2007, 2 pgs.
Haverinen, Anssi, et al, SystemC™ based SoC Communication Modeling for the OCP™ Protocol, V1.0, Oct. 14, 2002, 39 pages.
"Open Core Protocol (OCP)", Wikipedia, the free encyclopedia, http://en.wikipedia.org/wiki/Open_Core_Protocol, Feb. 9, 2009, 2 pages.
"Open Core Protocol", search query on Trademark Electronic Search System (TESS), United States Trademark and Patent Office, Feb. 7, 2009, 2 pages.
"Open Core Protocol", results of search query on Trademark Electronic Search System (TESS), United States Trademark and Patent Office, Feb. 7, 2009, 2 pages.
"Open Core Protocol Transaction Level 2", search query on Trademark Electronic Search System (TESS), United States Trademark and Patent Office, Feb. 7, 2009, 2 pages.
"Open Core Protocol Transaction Level 2", results of search query on Trademark Electronic Search System (TESS), United States Trademark and Patent Office, Feb. 7, 2009, 2 pages.
"SystemC", search query on Trademark Electronic Search System (TESS), United States Trademark and Patent Office, Feb. 7, 2009, 2 pages.

"SystemC", results of search query on Trademark Electronic Search System (TESS), United States Trademark and Patent Office, Feb. 7, 2009, 2 pages.

"SystemC", Wikipedia, the free encyclopedia, http://en.wikipedia.org/wiki/SystemC, Feb. 9, 2009, 6 pages.

Alexanian, H., Bolden, G., Amir, Z., "Simplifying the Behavior of System C Descriptions for Hardware/Software Covalidation," copyright 2005 [retrieved Apr. 26, 2008 ], 22 pages, Retrieved from the Internet. <URL: www.ocpip.org/pressroom/schedule/speaking/papers_presentations/Summit_OCP-IP_pavillion_pres.pps>.

Black, Co-Founder, "Eklectic Ally Electronic Systems Solutions", SystemC 2.1 Preview—DAC2004, www.EklecticAlly.com, info@EklecticAlly.com, Version 1.0 Copyright 2003, pp. 12.

Paul Klein et al., "Passive TLM", Intel Corporation, Paul.J.Klein@intel.com, Zafer.Kadi@intel.com, Jun. 7, 2004, pp. 16.

Wilson Snyder, "Verilator and SystemPerl", Sun Microsystems, VeriPool, wsnyder@wsnyder.org, http://www.veripool.com, Jun. 2004, pp. 14.

Sofiene Tahar, "Assertion and Model Checking of SystemC", hardware Verification Group, Department of Electrical and Computer Engineering, Concordia University Montreal, Quebec, Canada, First Annual North American SystemC Users Group (NASCUG) Meeting, Jun. 7, 2004, pp. 28.

Stuart Swan, Senior Architect, "System C—Towards a SystemC Transaction level Modeling Standard", Cadence Design Systems, Inc., Jun. 2004 pp. 12.

Brian McMurtrey et al., "SystemC Enabling Embedded System Design at Sandia", Sandia National Laboratories, Apr. 14, 2004, pp. 11.

Alan Kamas, "Dot.Org—Open Core Protocol: The SystemC Models" article, published in Apr./May 2004 issue of Chip Design Magazine, http://www.chipdesignmag.com/print/php?articleId=28?issueId=4, pp. 2.

Alan Kamas, "The SystemC OCP Models, an Overview of the SystemC Models for the Open Core Protocol", NASCUG Sep. 29, 2004, Copyright alan Kamas 2004, www.kamas.com, pp. 30.

2nd NASCUG Meeting Agenda, Meeting Presentations, GSPx 2004, Santa Clara, CA U.S.A., Sep. 29, 2004, http://www.nascug.org/nascug2004_fall.agenda.html, North American SystemC Users Group, pp. 2.

Hardware Verification Group, "SystemC Verification Problematic", System-on-Chip Verification <http://hvg.ece.concordia.ca/Research/SoC/>, 2004, pp. 26.

de Meer, H.; Richter, J.-P.; Puliafito, A.; Tomarchio, O., "Tunnel agents for enhanced Internet QoS," Concurrency, IEEE, vol. 6, No. 2, pp. 30-39, Apr.-Jun. 1998, URL: http//ieeexplore.ieee.org/stamp/stamp.jsp?arnumber=678787&isnumber=14923.

Melvin, S. and Patt, Y. 2002. Handling of packet dependencies: a critical issue for highly parallel network processors. In Proceedings of the 2002 international Conference on Compilers, Architecture, and Synthesis for Embedded Systems (Grenoble, France, Oct. 8-11, 2002). Cases '02. ACM, New York, NY, 202-209.

Wingard, Drew, "MicroNetworks-Based Integration for SOCs." In Design Automation Conference, 2001, pp. 673-677, 5 pages.

Wielage et al., "Networks on Silicon: Blessing or Nightmare?" Keynote speech Proceedings of the Euromicro Symposium on Digital System Design, Dortmund, Germany, Sep. 2002, 5 pages.

Ho et al., "The Future of Wires". In Proceedings of the IEEE, vol. 89, No. 4, pp. 490-504, Apr. 2001, 15 pages.

Dally et al., "Route Packets, Not Wires: On-Chip Interconnection Networks." In Design Automation Conference, pp. 684-689, Jun. 2001, 6 pages.

Benini et al., "Networks on Chips: A New SoC Paradigm", In IEEE 2002, Computer, vol. 35, No. 1, pp. 70-78, 9 pages.

Kurose, "Open Issues and Challenges in Providing Quality of Service Guarantees in High-Speed Networks", ACM Computer Communication Review, vol. 23, No. 1, pp. 6-15, Jan. 1993, 10 pages.

* cited by examiner

METHOD AND APPARATUS FOR ESTABLISHING A QUALITY OF SERVICE MODEL

RELATED APPLICATIONS

This application claims the benefit of and is a continuation in part of U.S. Pat. No. 7,665,069 titled 'Method and apparatus for establishing a quality of service model' issued Feb. 16, 2010, filed: Oct. 31, 2003, application Ser. No. 10/698,905, as well as is a continuation in part of and claims the benefit of U.S. Provisional Patent Application Ser. No. 60/946,096, titled "An interconnect implementing internal controls," filed Jun. 25, 2007, and its corresponding utility U.S. application Ser. No. 12/144,883, titled "An interconnect implementing internal controls," filed Jun. 24, 2008, as well as is a continuation in part of and claims the benefit of U.S. Provisional Patent Application Ser. No. 60/601,519 that was filed on Aug. 12, 2004 and is entitled, "Various methods and apparatuses for time annotated transaction level modeling and its corresponding utility U.S. application Ser. No. 11/203,554, titled 'Various methods and apparatuses for time annotated transaction level modeling' Filed: Aug. 11, 2005.

FIELD OF THE INVENTION

The present invention generally relates to integrated systems and an aspect specifically relates to guaranteeing quality of service in integrated systems.

BACKGROUND

A System on a Chip (SoC) is an Integrated Circuit (IC) incorporating most or all of the necessary electronic circuits and parts for a system such as a cellular telephone, digital camera, Set Top Box (STB), etc. The SoC may incorporate several circuits that might otherwise be on individual chips, such as a central processing unit (CPU), direct memory access (DMA) unit, memory, input/output (I/O) circuitry, and other circuits required by the specific application. By including all of the circuitry required for a specific application on one IC, production costs for the system and the size of the system can be reduced, and the reliability of the system can be improved.

A SoC is a single chip including several interacting entities. The entities may be referred to as Intellectual Property (IP) cores, since they are generally licensed from other vendors, rather than produced by the manufacturer of the SoC. Initiators, such as a CPU, issue requests to targets, such as a memory, for service. For example, a CPU may need access to a portion of a memory. The CPU would issue a request to the memory for the specific data. The memory would then service the request and return the requested data to the CPU. The initiators and targets are connected through interconnects.

Quality of Service (QoS) may refer to an expectation of performance in terms of how quickly requests are served. For example, an initiator can issue a request, and can expect those requests to be satisfied by the target within a specific time. Performance may be specified in several different ways. Bandwidth performance refers to receiving a certain number of requests per unit time. Latency performance refers to the time for a certain request to be returned. Jitter performance refers to a variation in the time between requests or responses arriving.

QoS standards are especially important when using a SoC because initiators used in SoCs typically have very tight service requirements. For example, some initiators (such as CPUs), have tight latency requirements, and need to be served quickly. Other initiators (such as communication interfaces) are more sensitive to bandwidth and jitter performance. Some SoC's suffer from a QoS model that cannot ensure that certain performance guarantees are met in the SoC.

SUMMARY

Figure 1:
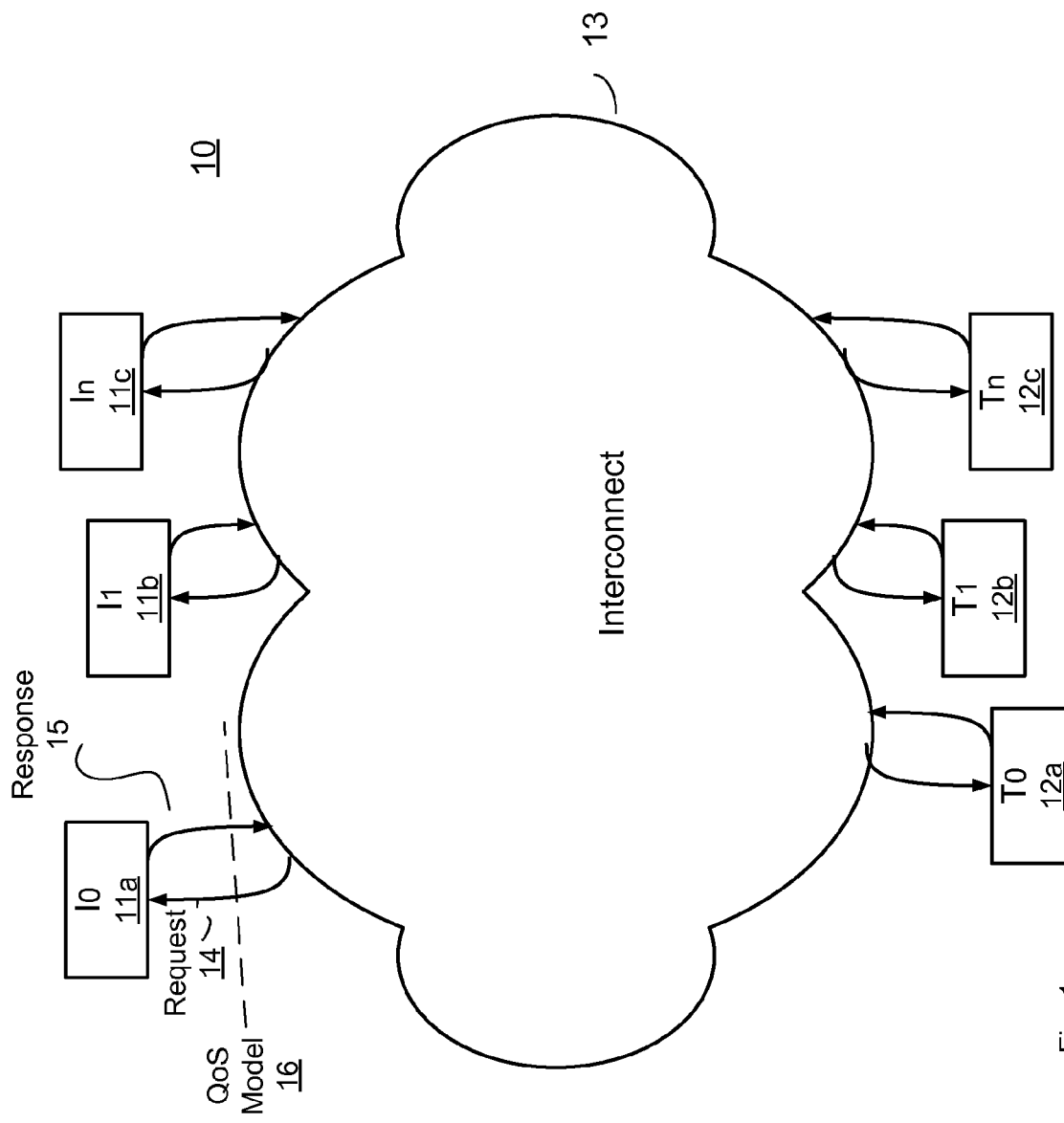
FIG. 1 illustrates an example System on a Chip according to one embodiment of the invention.

A method and an apparatus for a Quality of Service (QoS) model are disclosed. According to the QoS model, a request is received from an initiator in a first time less than or equal to one less than an ordinal number times an arrival interval, where the ordinal number signifies a position of the request among a group of requests. Also according to the model, the request that has been serviced is returned to the initiator in a second time less than or equal to a constant term plus the ordinal number times a service interval.

DETAILED DESCRIPTION

In the following description, numerous specific details are set forth, such as examples of named components, connections, number of requests in a group, etc., in order to provide a thorough understanding of the present invention. It will be apparent, however, to one skilled in the art that the present invention may be practiced without these specific details. In other instances, well-known components or methods have not been described in detail but rather as a block diagram to avoid unnecessarily obscuring the present invention. Thus, the specific details set forth are merely exemplary. The specific details may be varied from and still be contemplated to be within the spirit and scope of the present invention.

In general, methods and apparatus for implementing a Quality of Service (QoS) model are disclosed. According to an embodiment of the invention, the QoS model may be implemented on a System on a Chip (SoC) or other system where it is necessary to guarantee service between an initiator and a target. Initiators and targets are connected through an interconnect. An initiator, such as a Central Processing Unit (CPU) can request service from a target, such as a Random Access Memory (RAM). A thread may be a channel to send requests from an initiator to a target. The interconnect, guided by a QoS unit, determines which threads will be serviced by the target. According to the QoS model, a QoS contract may be established between an initiator and the rest of the system. According to the contract, the initiator guarantees that certain requests will arrive by certain deadlines, and the rest of the system guarantees that those requests will be serviced by other deadlines. The QoS model comprises an arrival model and a service model. The arrival model describes deadlines for receiving requests from the initiator, and the service model describes deadlines for receiving service from the target and the interconnect. According to the arrival model, requests from the initiator must arrive before a time $n*a$, where 'n' is the number of the request after the first request, and 'a' is a predetermined arrival interval. According to the service model, responses are issued in a time less than $K+n*s$, where 'K' is a predetermined constant term, and 's' is a predetermined service interval.

According to an embodiment, an allocation count is maintained for certain transaction threads. The allocation count may track whether a specific thread is being serviced. The allocation count may increment at a regular interval, and decrement when the thread is serviced. The allocation count can be used to determine which threads will be serviced. This determination could be based upon whether the allocation count is currently positive. The allocation count may have a maximum positive limit to ensure that an idle thread is not given too much priority. The positive limit may also be adjustable to insure that a lower priority bandwidth-allocated thread that is not serviced because a higher priority claim is being serviced will eventually receive its allocation. A priority associated with each transaction may be initially set low to achieve the performance defined by the component initiating the transaction's QoS contract.

A first allocation count may be maintained for a first transaction thread to track whether the first transaction thread is being serviced by the target in the Integrated Circuit. An adjustable positive limit is established having a first value for the first allocation count that establishes an initial maximum amount the first allocation count may go up to. A number of cycles that a given transaction has been waiting is counted when the first transaction thread has yet to have a request fulfilled from the target during a regular interval of time to guarantee a maximum latency is at least met as required by a Quality of Service contract for a component initiating that transaction. Spare capacity in components of the Integrated Circuit system are used when all QoS contracts are currently being met for the components in the Integrated Circuit system to let some components in the system use this spare capacity to exceed their target rate. The allocation count may be correlateable to establish a priority for servicing specific transaction threads. The allocation count is correlateable to establish priority for servicing specific transaction threads and thereby allow spare capacity in components of the system to be used when all QoS contracts are being met to let some components in the system use this spare capacity to exceed their target rate. A counter counts the cycles that a given transaction has been waiting and if this wait exceeds a set limit, the priority of the transaction is effectively promoted to a higher level in the system to cause the transaction to be serviced. When this number of counted cycles exceeds a limit, the priority of the transaction is in essence promoted to a higher level in the system. The adjustable positive limit for the first allocation count may raise up to a second value when the first value for the first allocation count has been reached and the first transaction thread has yet to have a request fulfilled from the target during a regular interval of time. The allocation count associated with each transaction is initially set to a low adjustable positive limit for the first allocation count to achieve the performance defined by the component initiating the transaction's QoS contract and an upper maximum limit is set to the allocation count values for each component in the Integrated Circuit to enforce the QoS contract priority throughout the system.

FIG. 1 illustrates an example System on a Chip according to one embodiment of the invention. The SoC 10 includes several initiators 11 coupled to several targets 12 through an interconnect 13. Several initiators 11a, 11b, and 11c are shown. A reference simply to an initiator 11 indicates that any of the initiators 11a-c may apply in that instance. The same holds true for the targets 12a-c, and etc. The initiators 11 may include devices such as CPUs, Direct Memory Access units (DMAs), graphics systems, audio systems, etc. The targets may include devices such as memories including cache memories, Random Access Memories (RAMs), Read Only Memories (ROMs), peripherals, DMA units, register programming interfaces, etc. The initiators 11 generally require service by the targets 12. The interconnect 13 links the various initiators 11 to the various targets 12. Generally, any initiator 11 can request service from any target 12.

An initiator 11 communicates with a target 12 by issuing requests 14 and receiving responses 15 to and from the interconnect 13. A request 14 may be, for example, a memory read request. The corresponding response 15 would then be data satisfying that request. By sending the response to the requesting initiator 11, the requested target 12 is said to have "serviced" the request. A QoS model describes a contract between an initiator 11 and the rest of the system at the boundary 16 between the specific initiator 11 and the interconnect 13. The QoS model specifies deadlines for receiving requests from the initiator 11 and deadlines for returning responses to the initiator 11.

Figure 2:
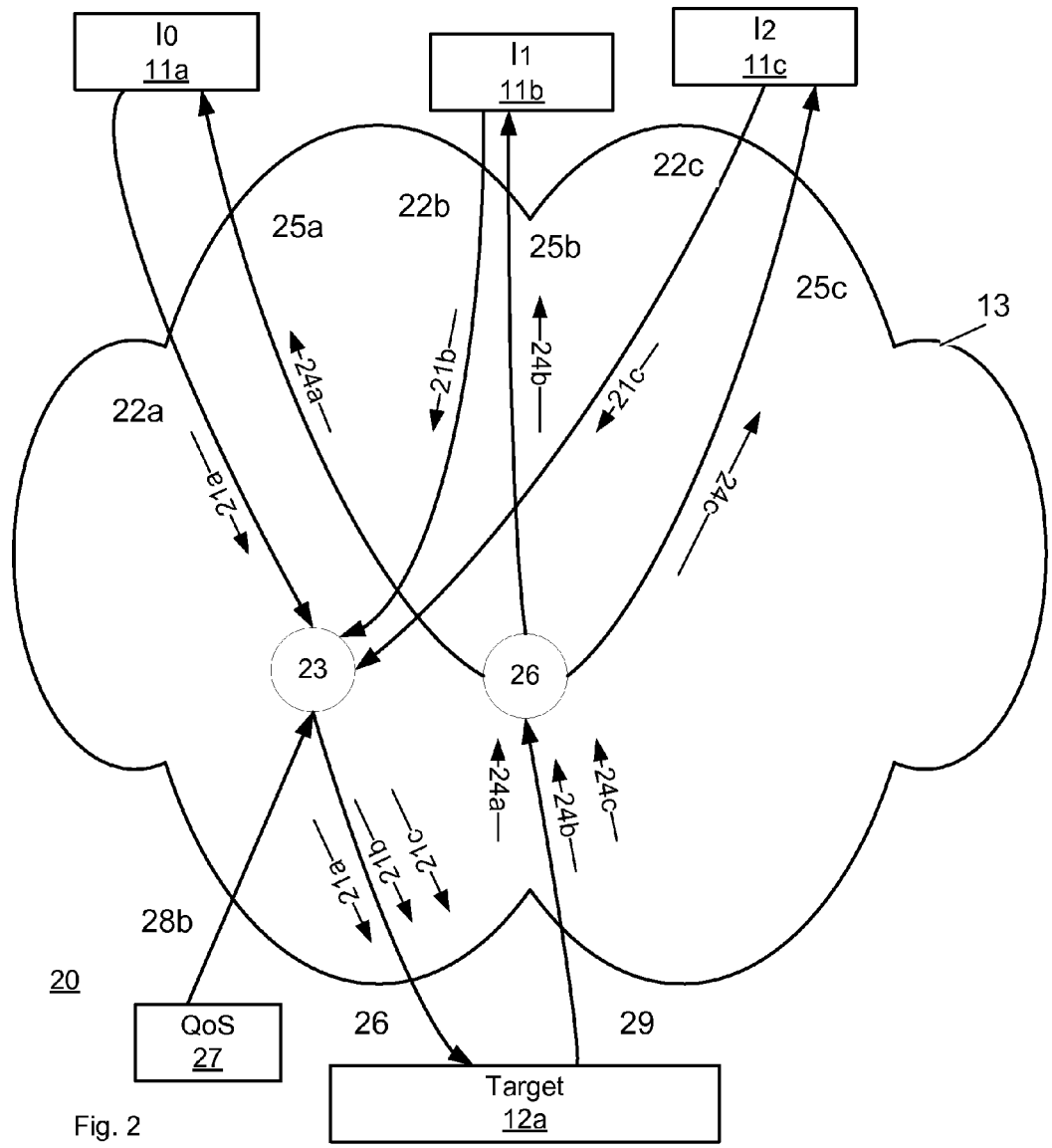
FIG. 2 illustrates a system for implementing a QoS model according to an embodiment of the invention.

FIG. 2 illustrates a system for implementing a QoS model according to an embodiment of the invention. The system 20 may be a SoC or other system requiring QoS management. Several initiators 11a-c are communicating with a target 12a. Although the target 12a is specified here, it is understood that any target 12 may be used. The initiators 11a-c issue groups of requests that are to be serviced by the target 12a. Each initiator 11a-c issues requests on one or more threads 21a-c. A thread 21 may be virtual channel established over a physical channel 22. As shown here, each initiator 11a-c has its own dedicated physical channel 22a-c that corresponds to that initiator 11a-c. Several threads may be multiplexed on the same physical channel 22. Requests from different threads are received at one or more arbitration points 23 inside the interconnect 13. The arbitration point 23 may be specific to the target 12a. In another embodiment, the arbitration point 23 may serve several different targets 12. The arbitration point 23 determines when, and in which order, requests are presented to the target 12a, and the target 12a determines its service timing, and in a multi-threaded case, some of the service ordering. When the requests have been serviced, they are returned to the initiators 11 as threads of responses 24a-c along the return channels 25a-c. The responses have been serviced by the target 12a, and are directed back to the original initiator 11 by the split point 26.

Several threads are shown on the physical channels 22 and 25. The threads 21a-c are request threads from the initiators 11a-c which are virtual channels carrying requests from the initiators 11a-c. Although they are only shown on a portion of the physical channels 22, the threads 21 "virtually" extend the length of the physical channels 22. Likewise, the response threads 24 are virtual channels along the physical response channels 25. A request channel 26 sends requests from the interconnect 13 to the target 12a. The request channel 26 is also observed by a QoS unit 27. The QoS unit 27 is coupled to the request channel through a channel 28a, and to the arbitration point 23 through the channel 28b. A response channel 29 sends responses from the QoS unit to the interconnect 13. As can be seen, the threads 21a, 21b, and 21c are multiplexed on the request channel 26. Likewise, the threads 24a, 24b, and 24c are multiplexed on the response channel 29.

The QoS unit 27 issues instructions to the interconnect 13 through the channel 28b. The QoS unit 27 could be inside the target 12a, inside the interconnect 13, or, as shown, independent. The interconnect 13 ultimately decides which request is issued to the target 12a, but the QoS unit 27 guides the interconnect 13 according to the contract and the QoS model. For each thread 21, the QoS unit 27 determines when the threads 21 will be presented to the target 12a for service according to the various contracts with the different initiators 11. The QoS unit 27, target 12a, and interconnect 13 together satisfy the requirements of the QoS contracts. The specifics of these QoS contracts will be discussed below.

Figure 3:
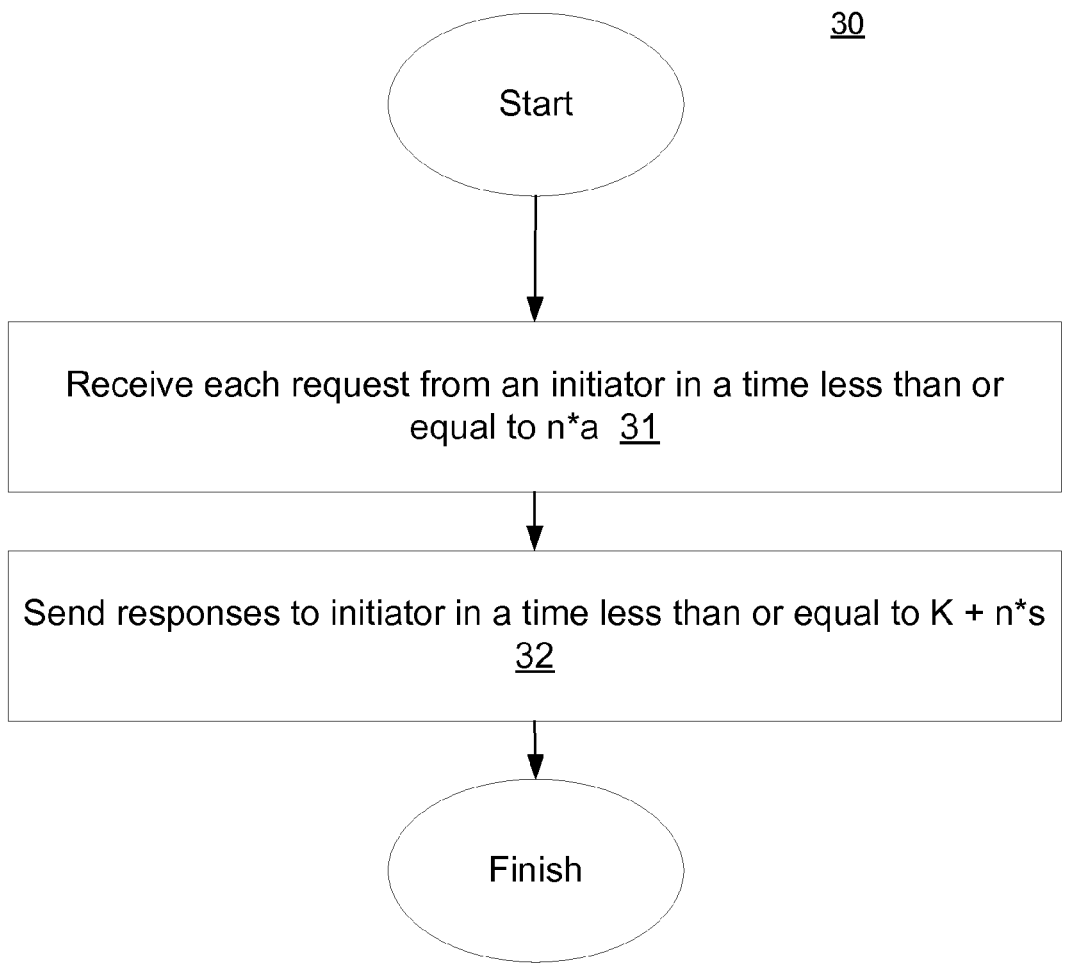
FIG. 3 is a flow chart describing a QoS model according to one embodiment of the invention.

FIG. 3 is a flow chart describing a QoS model according to one embodiment of the invention. In one embodiment the QoS unit 27, the interconnect 13, and the targets 12 implement the process 30. Block 31 describes an arrival model. In block 31, a group of requests is received from an initiator. Each request, according to the QoS model, is received at a time less than or equal to n*a, where n is an ordinal number describing the number of the request after the first request. For example, n is 0 for the first request, 1 for the second request, etc. The variable a refers to an arrival interval, which is a predetermined time that refers to the system's accepted interval for request arrivals. According to this model, a group of seven requests arrives before a time 6a after the first request arrives. Each request in the group can arrive at a time n*a after the first request, however the request may also arrive at any time before. For example, the second request can arrive any time after the first request and before a, the third request any time after the second request and before 2a, etc. The model establishes a deadline at or before which each request must arrive. The arrival interval a may be fixed by the system or variable, depending on the application. It is understood that a first logic can determine whether the arrival model is satisfied.

Block 32 describes a service model. In block 32, a response is sent to the initiator in a time less than or equal to K+n*s. The K term is a constant term that covers such quantities as the latency and jitter of service. The K term is added to each group, and gives a target servicing the group more latitude to schedule other groups that may have higher priority or to lead to higher overall system efficiency. The s variable is a service interval that is analogous to the a variable. The K and s terms can be fixed for a specific system, or may change depending on the initiator 11, the target 12, etc. It is understood that a logic, including the target 12, the interconnect 13, and the QoS unit 27 can satisfy the service model once it is determined that the arrival model has been satisfied.

Figure 4A:
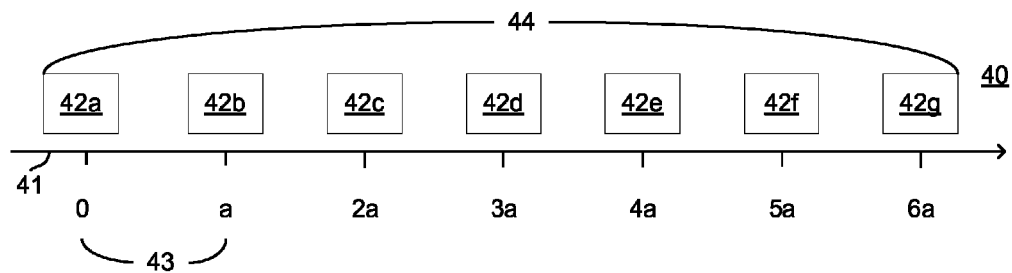
FIGS. 4A-C illustrate an arrival model according to one embodiment of the invention.
Figure 4B:
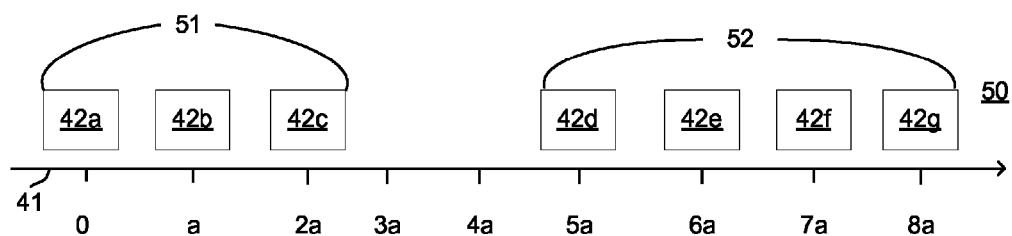
Figure 4C:
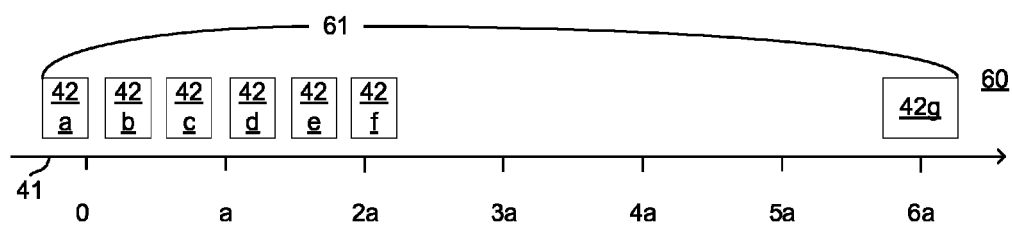

The QoS model comprises two parts: an arrival model and a service model. FIGS. 4A-C illustrate an arrival model according to one embodiment of the invention. FIG. 4A illustrates a group of requests according to an arrival model 40. The arrival model 40 includes a time line 41 to indicate when the requests 42 are received. The group of requests 44 includes several individual requests 42. The model 40 includes a series of deadlines by which the requests 42 should be received in order to satisfy the contract. The request interval 43 or a signifies a deadline by which time the request should be received by the rest of the system. For each request in the group, the request must arrive before a time established by the following equation:

$$n*a$$

where n corresponds to the number in sequence after the first request in the group (e.g., the third request 42c has an n=2). The arrival time of the first response may be defined as time 0.

A group of requests 44 comprising the requests 42a-g may be sent by the initiator 11 to the interconnect 13. The initiator 11 issues a group of requests 44 to a single target 12. According to the QoS contract, the entire group of requests 44 is received by the rest of the system in a time less than or equal to one less than the number of requests in the group times the request interval a 43. Each individual request is received before a times one less than the number of the specific request. For example, the second request 42b is received before a time 1a, and the third request 42c is received before a time 2a. As can be seen, each individual request in the group 44 arrives in a time less than or equal to n*a, and the QoS arrival model is satisfied for the group of requests 44. It can be further seen that each individual request in the group 44 arrives just before its arrival deadline n*a. Such behavior is characteristic of isochronous data production processes, which are common in applications such as telecommunications and streaming media.

FIG. 4B illustrates two request groups. The request group 44 has been divided into two request groups 51 and 52, which may be necessary because requests 42d-g do not satisfy the arrival model when grouped with 42a-c. The request group 51 comprises the requests 42a-c, and the request group 52 comprises the requests 42d-g. In order to satisfy the arrival model, the request 42c must arrive before 2a after the request 42a arrives. Likewise, in order to satisfy the arrival model, the request 42g must arrive before 2a after the request 42d arrives.

FIG. 4C illustrates a received request group. The request group 61 comprises the requests 42a-g. According to the QoS model, the request 42b must arrive before time a, the request 42c must arrive before time 2a, etc. As can be seen in FIG. 4C, the request 42f is received before the time 2a, even though the deadline for receiving the request 42f is time 5a. The model 60 illustrates that an initiator 11 is free to send requests early. The request 42g is received before the time 6a. As can be seen there is a large gap between the time that the sixth request 42f and the seventh request 42g are received. However, since the requests 42a-g are all received according to the QoS model, the initiator 11 has satisfied the contract.

Figure 5A:
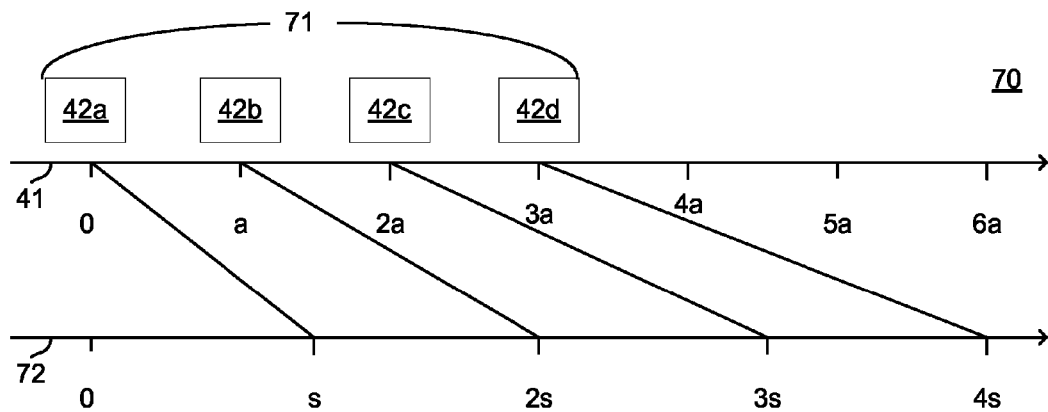
FIGS. 5A and 5B illustrate a service model according to one embodiment of the invention.
Figure 5B:
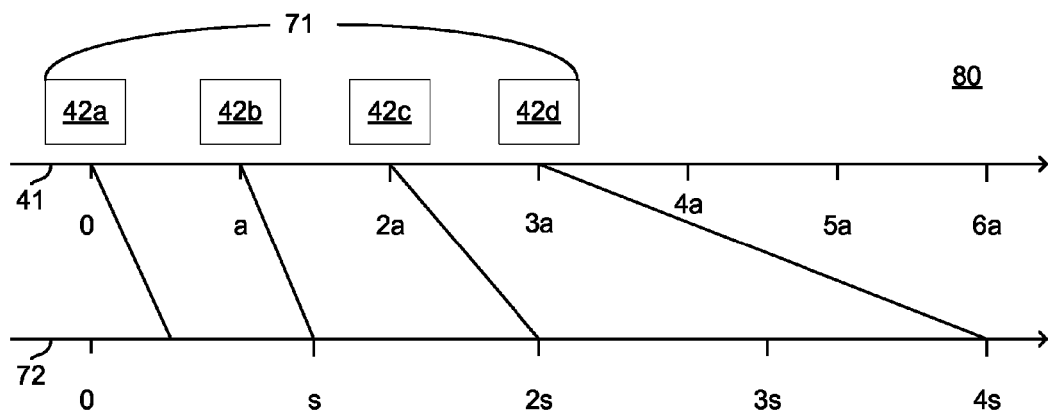

FIGS. 5A and 5B illustrate a service model according to one embodiment of the invention. According to FIG. 5A, the service model 70 includes the group of requests 71 including the requests 42a-d. According to the arrival model, the group 71 is to be received before the time 3a. The timeline 72 shows the time at which specific requests are serviced. According to the service model, a group of requests must be serviced before a time equal to:

$$K+n*s$$

where K is a constant term and s is the service interval. The K term is a term included in the contract, and applies to each group of requests. The K term gives the target 12 extra time to service the group 71. The target 12 may divide up the K term as it wishes when servicing the request group 71. The K term could be an initial latency term, or can be used by the QoS unit 27 however it desires. The K term can be used, for example, to give the target 12 more time to service a request from another initiator 11. In one embodiment, the service interval s is a time that is greater than or equal to the arrival interval a. Since the requests cannot be serviced until they have arrived, the service interval s is necessarily greater than or equal to the arrival interval a. If a is less than s, the service model behaves as though a were equal to s. In one embodiment, it is desirable to have a and s equal. The service interval s may also be thought of as a nominal bandwidth term. In this example, the K term is equal to the service interval s, for simplicity. However, it is understood that any K term can be chosen independent of the service interval s. Also, the service term is given an arbitrary value of s=1.5a in this example.

According to the service model, the entire group 71, which comprises four requests, must be serviced by the time equal to K+n*s, which is s+3*s=4s (or 6a). Remembering that the K term is assigned a value of s in this example, the first request 42a must be serviced by the time s, since s+0*s=s. Likewise, the second request 42b must be serviced by the time 2s, since s+1*s=2s. The interconnect 13 and target 12 has used the K term here to delay the servicing of the first request 42a. As can be seen in FIG. 5A, the group 71 has been serviced according to the model, since each request is received before its respective deadline.

FIG. 5B illustrates an alternative servicing of the group 71. In this example 80, remembering that K has a value of s, the first and second requests 42a and 42b are serviced before the time s. The third request 42c is serviced at 2s, and the fourth request 42d is not serviced until 4s. The fourth and last request does not need to be serviced until 4s according to the model, and since the target 12 has serviced the first three requests 42a-c early, the target 12 is free to service other requests as long as the final request 42d is serviced before a time 4s. As can be seen in FIG. 5B, the group 71 has been serviced according to the model. Accordingly, spare capacity in components of the system is being used when all QoS contracts are being met to let some components in the system use this spare capacity to exceed their target rate. Note, allocation count is correlateable to establish priority for specific transaction threads.

Figure 6:
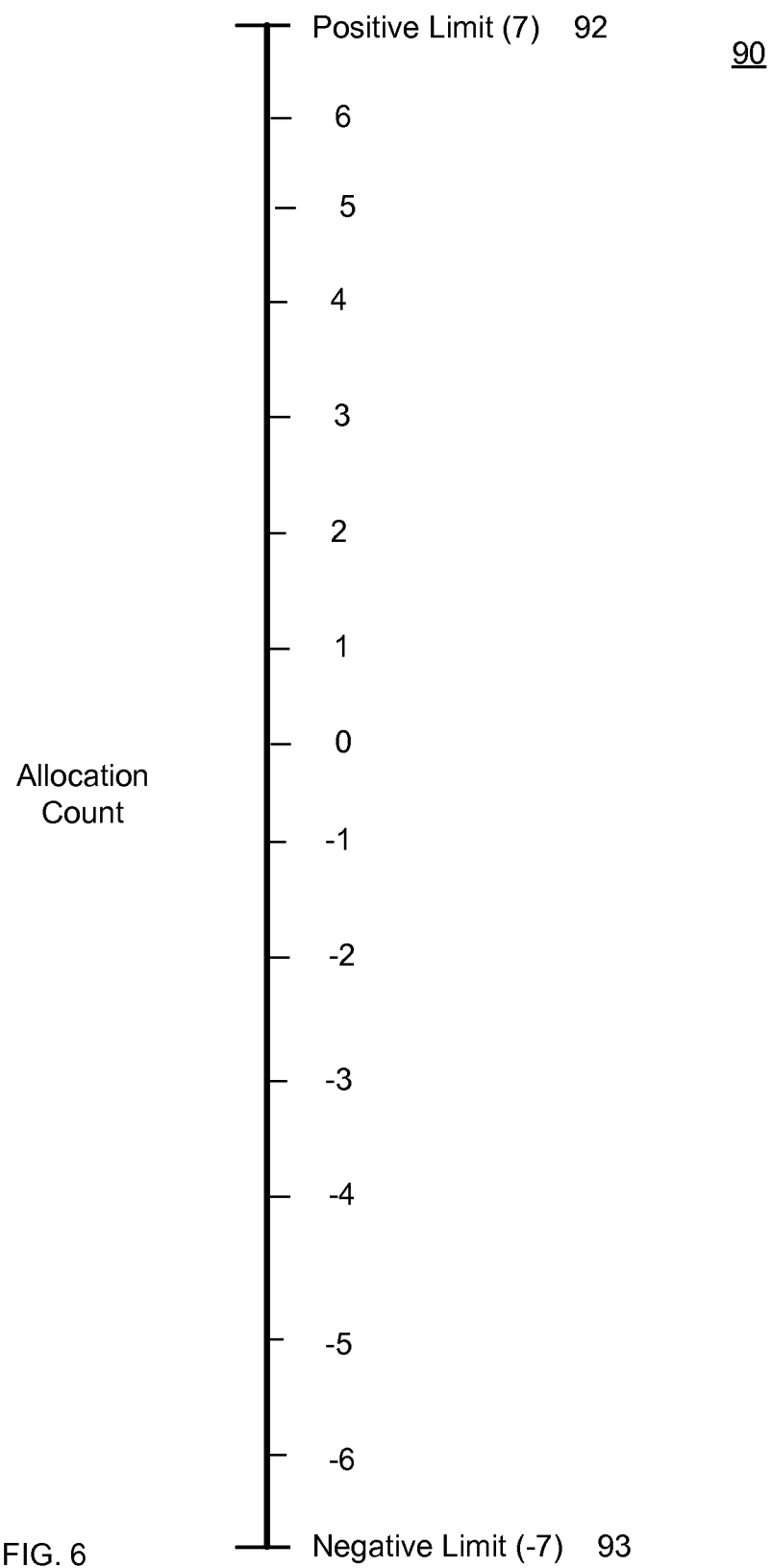
FIG. 6 illustrates an allocation count according to an embodiment of the present invention.

FIG. 6 illustrates an allocation count according to an embodiment. An allocation count 90 can be maintained in the QoS unit 27 for each thread. The allocation count 90 generally measures whether or not a specific thread is being serviced. In one embodiment, there are three types of threads: 1) high-priority threads which are given priority for service over all other threads as long as they stay within a pre-allocated portion of the target's 12 bandwidth, 2) bandwidth allocation threads which are generally guaranteed a portion of a target's 12 bandwidth, and 3) best effort threads, which are serviced whenever the target 12 has extra bandwidth to do so. Allocated bandwidth and priority threads are monitored using the allocation count 90. The allocation meter 91 is an illustration of the number of credits issued to a specific thread. The allocation meter 91 has a positive limit 92 and a negative limit 93. These limits are explained below.

The allocation count 90 can be used to determine a priority between threads that are subject to bandwidth allocation (i.e. high-priority and bandwidth allocation threads). Generally, if a thread is not being serviced, often because a high-priority thread has required the service of a specific target 12, the allocation count 90 will become increasingly positive. Conversely, if a thread has received more service than it was allocated, its allocation count will become negative. A negative allocation count 90 can be used to demote the priority of that thread, giving other threads a better chance of receiving service.

At a regular interval, the allocation count 90 is incremented. For example, at time 0 the allocation count 90 for a specific thread is 0. At time t, the thread is issued one credit. Therefore, if the thread has not requested service, the allocation count 90 goes positive, to a count of +1. When the thread receives service, a credit is debited. For example, at time t, if the thread requests service once, the allocation count 90 for the thread will be 0, since the thread has received one credit at the time t (its regular credit), and has had that credit debited by having its request fulfilled. It is possible for the allocation count to go negative. For example, if at time t, a thread has already requested service twice, the thread will merely have received one credit, and will have two credits debited, resulting in an allocation count 90 of −1.

The allocation count 90 has a positive 92 and a negative 93 limit. As shown here, the positive limit 92 is +7 credits, and the negative limit 93 is −7 credits. If a thread is idle for a long time, the thread will accumulate an excess of credits. As a result, even with the thread resuming requests for service, the allocation count 90 may never return to zero, and the specific thread may always be serviced. For this reason, the positive limit 92 is established. A large positive limit makes it difficult to honor the QoS contract of other initiators 11, while a QoS model using a small positive limit may not be capable of handling request arrival jitter introduced by the interconnect 13. Further, a higher positive limit may be warranted where the QoS scheme and target behavior introduce service jitter. Hence the need for the dynamic adjustment of the positive limit.

A negative limit 93 is also established. The negative limit 93 protects a thread from having too many requests serviced and exceeding its allocated bandwidth by too much. If this is the case, the thread may not receive service for a long period of time because it is constantly being demoted as a result of its negative allocation count 90. The negative limit 93 thus reduces service jitter.

Thus, a counter counts the cycles that a given transaction has been waiting to guarantee the maximum latency is at least met as required by their contract. If this exceeds a limit, the priority of the transaction is in essence promoted to a higher level in the system. the above control loop in essence varies a priority a transaction to track the target bandwidth and corresponding latency. An allocation count associated with each transaction is initially set low to achieve the performance defined by the component initiating the transaction's QoS contract. Upper limits are set to the allocation count values for each master will enforce this QoS contract priority. When all contracts are being met and the system may be able to use the spare capacity at components such as the interconnect or memory controller and let some other components in the system use this spare capacity to exceed their target rate. This makes it possible to reduce that target rate later when the system requires more capacity, yet still achieving the QoS within the overall time period. Changes to priority values of transactions and the other mechanisms discussed above can be used to make use of this spare capacity. Thus, for example, the operation of the Quality-of-Service (QoS) in the system is, therefore, the allocation of relative priorities to the transactions in the system. This has the useful effect of allowing components that can use additional capacity to do so if the QoS contracts of all other components are currently being met. The QoS mechanism allows for optimizing for efficiency and guaranteeing the performance of the system.

Figure 7:
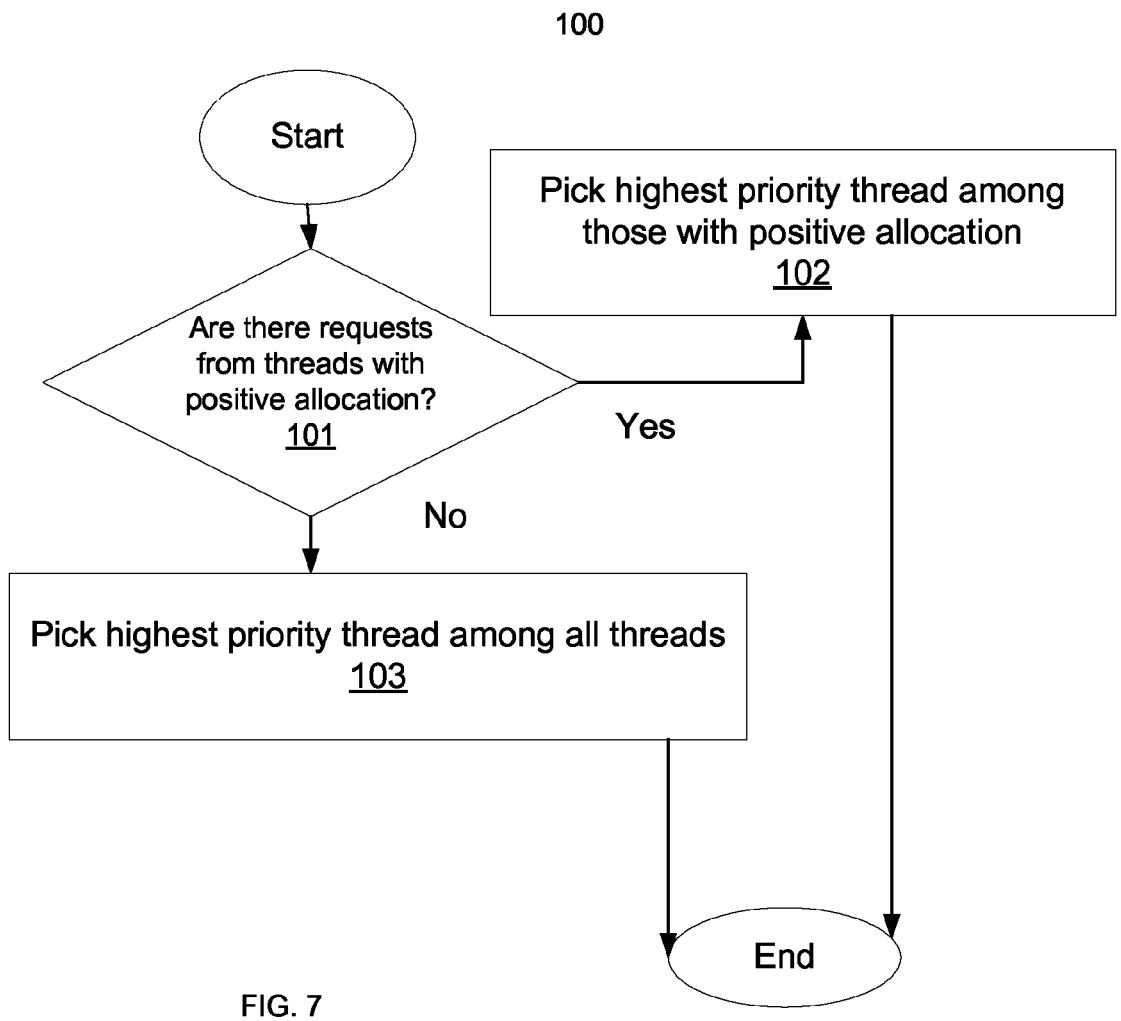
FIG. 7 is a flow chart illustrating using an allocation count to establish priority for specific threads.

FIG. 7 is a flow chart illustrating using an allocation count 90 to establish priority for specific threads. The process 100 explains awarding priority to specific threads. This priority may be used to determine when a target 12 will service a thread 21. In block 101, it is determined whether there are requests from threads having positive allocation. The positive allocation is determined and accumulated using the technique described relating to the allocation count 90. If threads with a positive allocation are found, in block 102, the highest priority thread among those with positive allocation is chosen. According to one embodiment, the highest priority thread may be a thread that is a high-priority thread or a thread having the most positive allocation count 90. According to other embodiments, other priority systems may be established.

In block 103, if there are no threads having positive allocation, the highest priority thread is chosen to be serviced. As above, the priority may be determined using different techniques, including awarding service to a thread having a high-priority designation. The allocation priority may be implemented in the QoS unit 27. Once the QoS unit 27 has determined the thread having the highest priority, that thread is serviced. The process may continue for future service.

Figure 8:
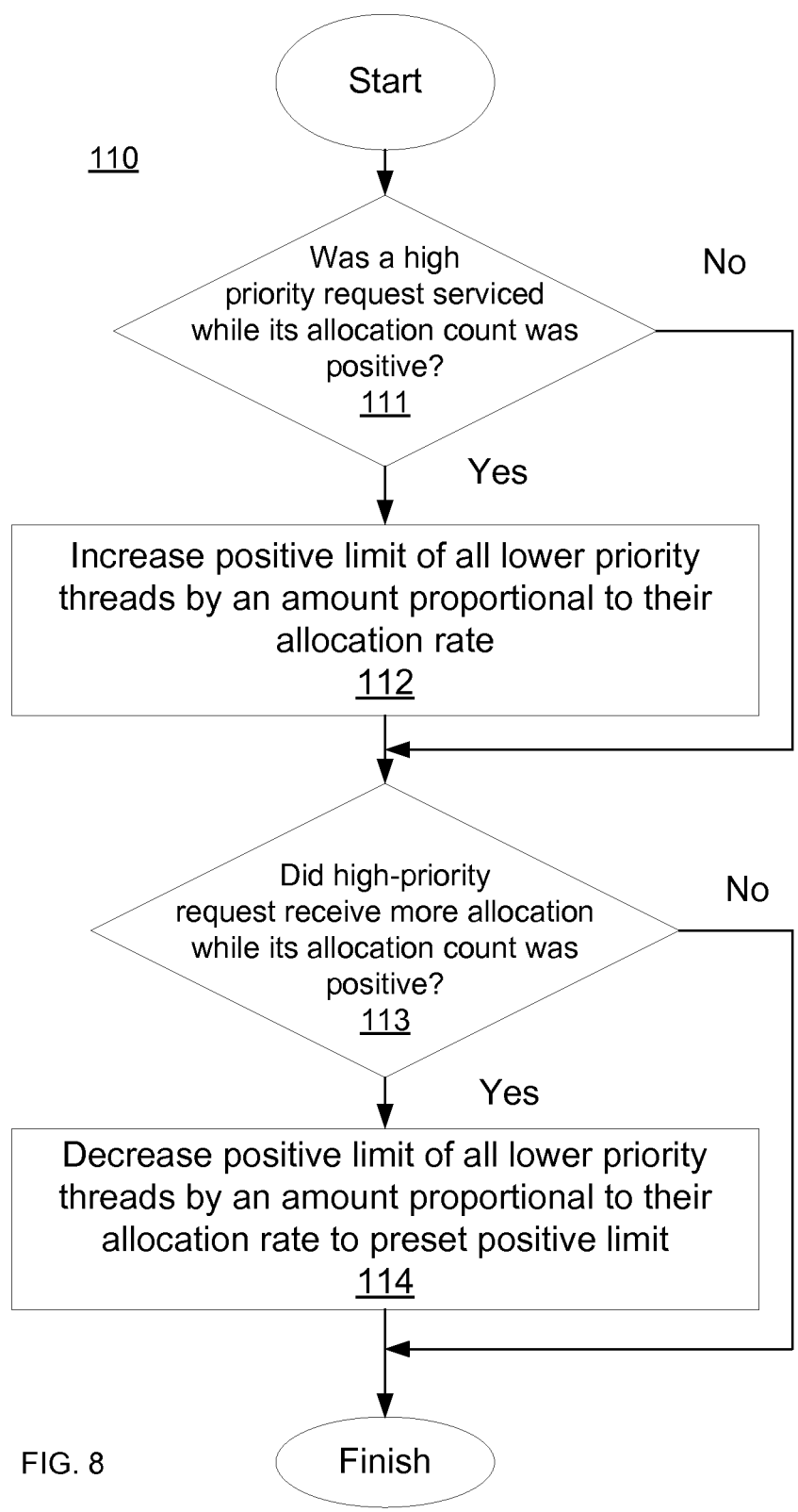
FIG. 8 is a flow chart describing the operation of an allocation count using an adjustable positive limit.

FIG. 8 is a flow chart describing the operation of an allocation count using an adjustable positive limit. The positive limit 92 may need to be adjusted if, for example, a high-priority thread is monopolizing a target 12. A bandwidth allocation thread that needs access to the target 12 may be left waiting for a long period of time because of the high-priority thread. Eventually, the allocation count 90 for the bandwidth allocation thread would reach the positive limit 92. However, the bandwidth allocation thread has still not been serviced. It may be desirable in some instances to dynamically raise the limit 92 in such a situation, because if the limit is left constant, in some instances the QoS contract may not be satisfied.

The process 110 may be exercised each time a request is to be serviced by a target 12. In block 111, it is determined whether a high-priority request from a high priority thread was serviced while its allocation was positive. If a request was serviced from a high-priority thread, in block 112, the positive limit 92 of all lower-priority threads is increased by an amount proportional to their allocation rate. For example, if a bandwidth allocation thread has an allocation rate of 50% (i.e., the thread is allocated 50% of the specific target's 12 bandwidth), the limit 92 is raised by 50% of the credit consumed by the high-priority thread. For example, the positive limit 92, in one embodiment, may be 6. Where the high-priority thread consumed two credits, the limit would be raised to 7. Returning to block 111, if no high-priority request was serviced, the process 110 advances to block 113.

In block 113, it is determined whether a high-priority request received more allocation while its allocation count was positive. If the high-priority thread's allocation count increased while it had a positive allocation count, this is an indication that the higher-priority thread is not requesting service. Since the higher-priority thread is not requesting service, the lower-priority thread can receive service, thus decreasing its allocation count 90. Either the lower-priority thread is being serviced or not requesting service, but in either case the positive limit 92 should be returned to normal in block 114 to avoid giving priority to a thread that does not need it.

A system that includes an interconnect coupled to an initiator and a target. A first logic block is coupled to or within the interconnect, and configured to maintain a first allocation count for a first thread to track bandwidth usage by the first thread. A second logic block is in communication with the first logic block, and configured to establish a positive limit having a first value for the first allocation count. A third logic block is in communication with the second logic block, and is configured to raise the positive limit to a second value when a second thread having a second allocation count is serviced and the second allocation count is positive. A fourth logic block is coupled to the second logic block, and is configured to reduce the raised positive limit to a third value when the second allocation count receives a credit and is positive. The positive limit may also be raised by an amount proportional to an allocation rate of the first thread. The first thread may be a bandwidth allocation thread. The second thread may be a high-priority thread. A fifth logic block coupled to or within the interconnect and in communication with the first logic block. The logic blocks cooperate and are configured to satisfy a service model if an arrival model is satisfied by the initiator. The logic blocks use the first allocation count to satisfy the service model. The arrival model may be satisfied by the initiator if a request arrives before a first time less than or equal to an ordinal number times an arrival interval, wherein the ordinal number signifies a position of the request among a group of requests. The service model is satisfied if the request is serviced before a second time less than or equal to a constant term plus the ordinal number times a service interval.

Figure 9:
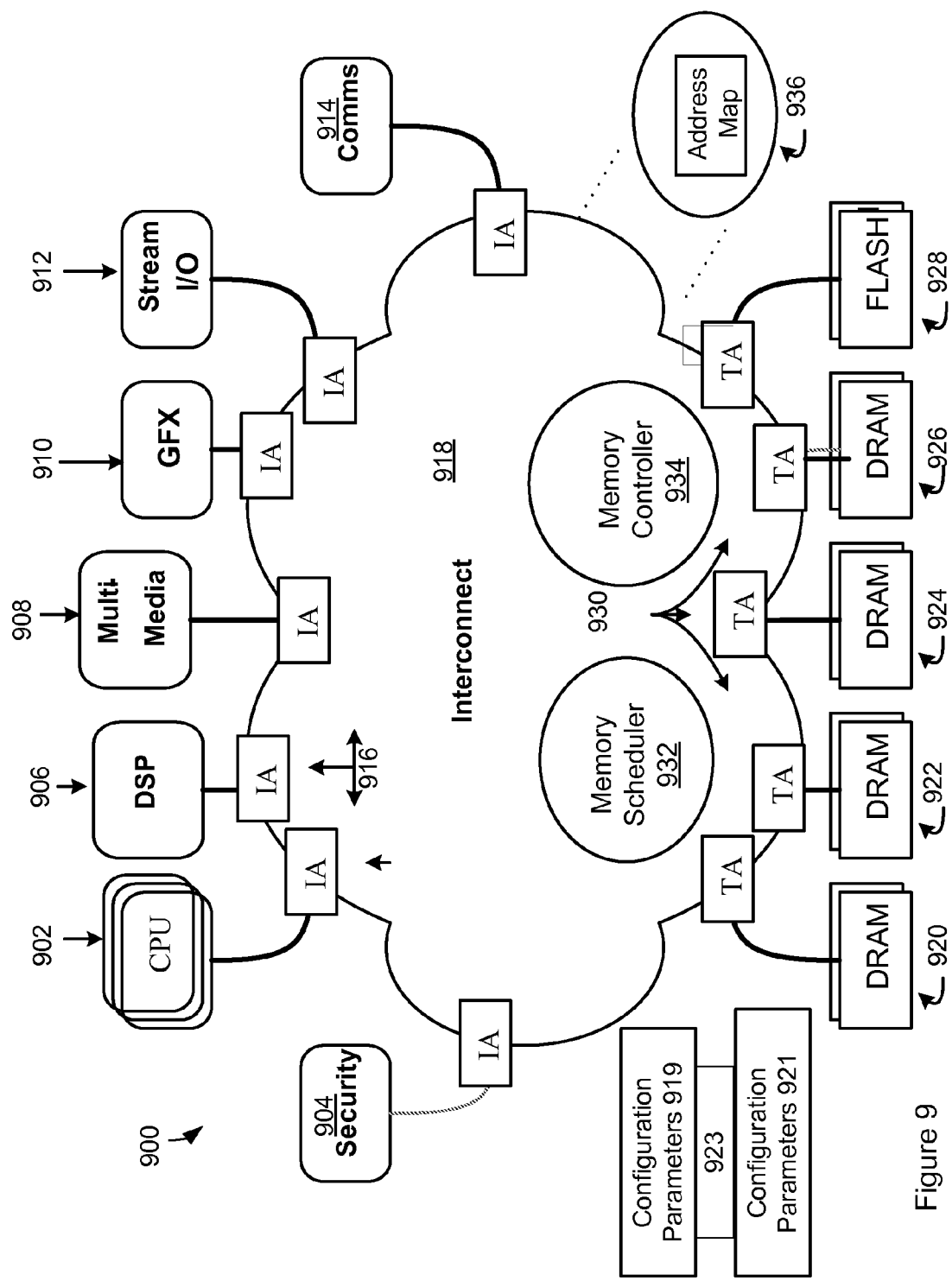
FIG. 9 illustrates a block diagram of an embodiment of a System-on-a-Chip having multiple initiator IP cores and multiple target IP cores that communicate transactions such as read and write requests, as well as responses to those requests over an interconnect.

FIG. 9 illustrates a block diagram of an embodiment of a System-on-a-Chip having multiple initiator IP cores and multiple target IP cores that communicate transactions such as read and write requests, as well as responses to those requests over an interconnect.

Each initiator IP core such as a CPU IP core 902, an on chip security IP core 904, a Digital Signal Processor (DSP) 906 IP core, a multimedia IP core 908, a Graphics IP core 910, a streaming Input-Output (I/O) IP core 912, a communications IP core 914, such as a wireless transmit and receive IP core with devices or components external to the chip, etc. and other similar IP cores may have its own initiator agent 916 to interface with the interconnect 918. Each target IP core, such as a first DRAM IP core 920 through a fourth DRAM IP core 926 as well as a FLASH memory IP core 928, may have its own target agent 930 to interface with the interconnect 918. Each DRAM IP core 920-926 may have an associated memory scheduler 932 as well as DRAM controller 934.

The Intellectual Property cores (IP) have self-contained designed functionality to provide that macro function to the system. The interconnect 918 implements an address map 936 with assigned address for the target IP cores 920-928, and potentially the initiator IP cores 902-914 in the system to route the requests, and potentially responses between the target IP cores 920-928 and initiator IP cores 902-914 in the integrated circuit. Most of the distinct IP cores communicate to each other through the memory IP cores 920-926 on and off chip. The DRAM controller 934 and address map 936 in each initiator agent 916 and target agent 930 abstracts the real IP core addresses of each DRAM IP core 920-926 from other on-chip cores by maintaining the address map and performing address translation of assigned logical addresses in the address map to physical IP addresses.

The interconnect 918 provides a shared communications bus between IP core sub-systems 920-928 and 902-914 of the system. All the communication paths in the shared communication bus need not pass through a single choke point, rather many distributed pathways may exist in the shared communication bus. The on-chip interconnect 918 may be a collection of mechanisms that may be adapters and/or other logical modules, along with interconnecting wires that facilitate address-mapped and arbitrated communication between the multiple Intellectual Property cores 902-914 and 920-928.

The interconnect 918 may be part of an integrated circuit, such as System-on-a-Chip, that is pipelined with buffering to store and move requests and responses in stages through the System-on-a-Chip. The interconnect 918 may have flow control logic that 1) is non-blocking with respect to requests from another thread, as well as with respect to requiring a response to an initial request before issuing a subsequent request from the same thread, 2) implements a pipelined protocol, and 3) maintains each thread's expected execution order. The interconnect 918, other components in the system, or the entire system may use the methods and apparatuses discussed above to establish a quality of service model to check the quality of service within the system. As discussed, the Quality-of-Service (QoS) mechanisms to optimize the performance Quality-of-Service at both the transaction level and the system level guarantees of bandwidth and latency to each processing element in the system and considers the variations in traffic profiles from all of the processing elements.

Figure 10:
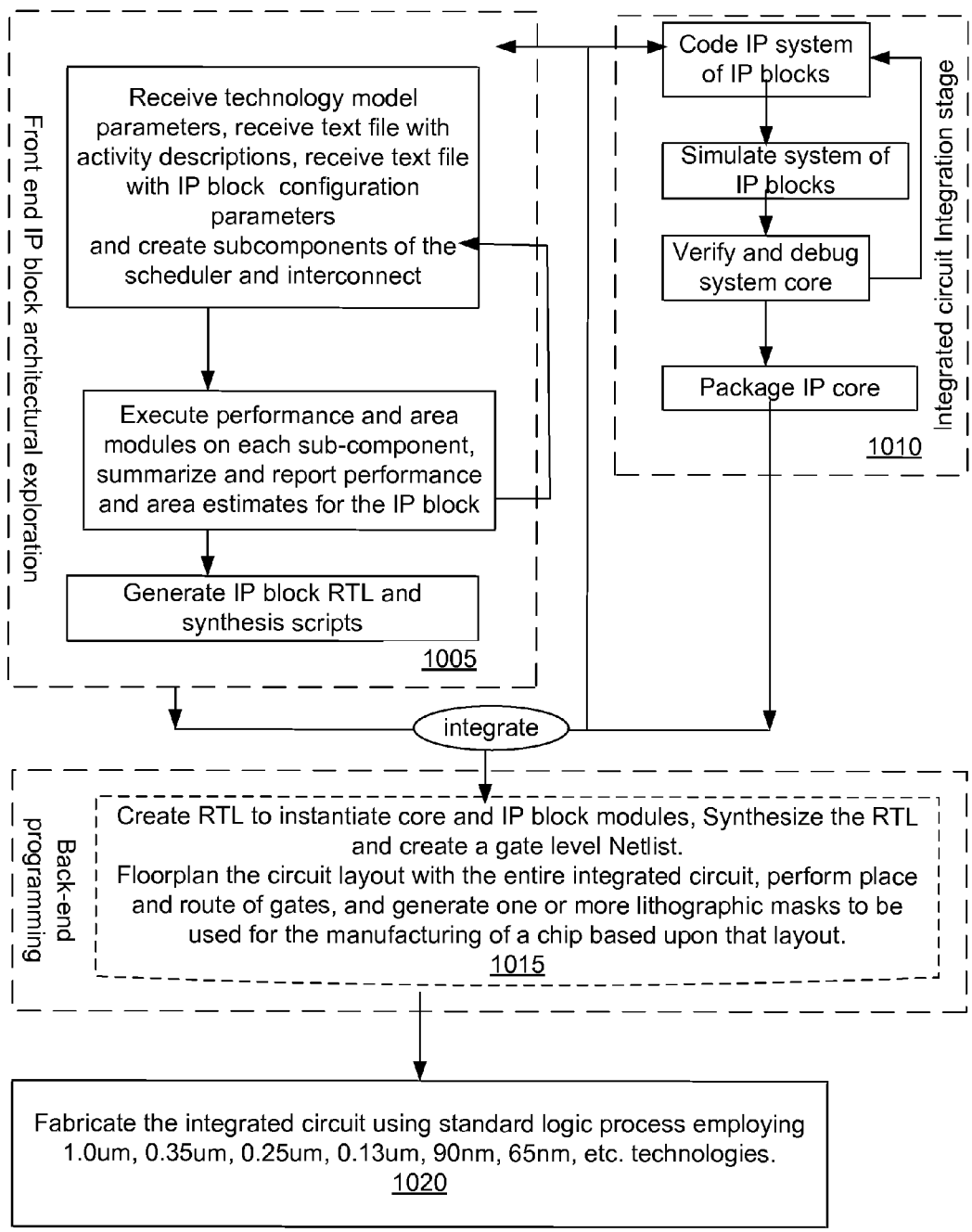
FIG. 10 illustrates a flow diagram of an embodiment of an example of a process for generating a device, such as a System on a Chip, with the designs and concepts discussed above for the Interconnect and Memory Scheduler.

FIG. 10 illustrates a flow diagram of an embodiment of an example of a process for generating a device, such as a System on a Chip, with the QoS designs and concepts discussed above for components in the system such as the Interconnect and Memory Scheduler. The example process for generating a device with from designs of the Interconnect and Memory Scheduler may utilize an electronic circuit design generator, such as a System on a Chip compiler, to form part of an Electronic Design Automation (EDA) toolset. Hardware logic, coded software, and a combination of both may be used to implement the following design process steps using an embodiment of the EDA toolset. The EDA toolset such may be a single tool or a compilation of two or more discrete tools. The information representing the apparatuses and/or methods for the circuitry in the Interconnect Memory Scheduler, etc. may be contained in an Instance such as in a cell library, soft instructions in an electronic circuit design generator, or similar machine-readable storage medium storing this information. The information representing the apparatuses and/or methods stored on the machine-readable storage medium may be used in the process of creating the apparatuses, or representations of the apparatuses such as simulations and lithographic masks, and/or methods described herein.

Aspects of the above design may be part of a software library containing a set of designs for components making up the scheduler and Interconnect and associated parts. The library cells are developed in accordance with industry standards. The library of files containing design elements may be a stand-alone program by itself as well as part of the EDA toolset.

The EDA toolset may be used for making a highly configurable, scalable System-On-a-Chip (SOC) inter block communication system that integrally manages input and output data, control, debug and test flows, as well as other functions. In an embodiment, an example EDA toolset may comprise the following: a graphic user interface; a common set of processing elements; and a library of files containing design elements such as circuits, control logic, and cell arrays that define the EDA tool set. The EDA toolset may be one or more software programs comprised of multiple algorithms and designs for the purpose of generating a circuit design, testing the design, and/or placing the layout of the design in a space available on a target chip. The EDA toolset may include object code in a set of executable software programs. The set of application-specific algorithms and interfaces of the EDA toolset may be used by system integrated circuit (IC) integrators to rapidly create an individual IP core or an entire System of IP cores for a specific application. The EDA toolset provides timing diagrams, power and area aspects of each component and simulates with models coded to represent the components in order to run actual operation and configuration simulations. The EDA toolset may generate a Netlist and a layout targeted to fit in the space available on a target chip. The EDA toolset may also store the data representing the interconnect and logic circuitry on a machine-readable storage medium.

Generally, the EDA toolset is used in two major stages of SOC design: front-end processing and back-end programming. The EDA toolset can include one or more of a RTL generator, logic synthesis scripts, a full verification testbench, and SystemC models.

Front-end processing includes the design and architecture stages, which includes design of the SOC schematic. The front-end processing may include connecting models, configuration of the design, simulating, testing, and tuning of the design during the architectural exploration. The design is typically simulated and tested. Front-end processing traditionally includes simulation of the circuits within the SOC and verification that they should work correctly. The tested and verified components then may be stored as part of a stand-alone library or part of the IP blocks on a chip. The front-end views support documentation, simulation, debugging, and testing.

In block 1005, the EDA tool set may receive a user-supplied text file having data describing configuration parameters and a design for at least part of a scheduler having multiple tiling functions. The data may include one or more configuration parameters for that IP block. The IP block description may be an overall functionality of that IP block such as an Interconnect, memory scheduler, etc. The configuration parameters for the Interconnect IP block and scheduler may include parameters as described previously.

The EDA tool set receives user-supplied implementation technology parameters such as the manufacturing process to implement component level fabrication of that IP block, an estimation of the size occupied by a cell in that technology, an operating voltage of the component level logic implemented in that technology, an average gate delay for standard cells in that technology, etc. The technology parameters describe an abstraction of the intended implementation technology. The user-supplied technology parameters may be a textual description or merely a value submitted in response to a known range of possibilities.

The EDA tool set may partition the IP block design by creating an abstract executable representation for each IP sub component making up the IP block design. The abstract executable representation models TAP characteristics for each IP sub component and mimics characteristics similar to those of the actual IP block design. A model may focus on one or more behavioral characteristics of that IP block. The EDA tool set executes models of parts or all of the IP block design. The EDA tool set summarizes and reports the results of the modeled behavioral characteristics of that IP block. The EDA tool set also may analyze an application's performance and allows the user to supply a new configuration of the IP block design or a functional description with new technology parameters. After the user is satisfied with the performance results of one of the iterations of the supplied configuration of the IP design parameters and the technology parameters run, the user may settle on the eventual IP core design with its associated technology parameters.

The EDA tool set integrates the results from the abstract executable representations with potentially additional information to generate the synthesis scripts for the IP block. The EDA tool set may supply the synthesis scripts to establish various performance and area goals for the IP block after the result of the overall performance and area estimates are presented to the user.

The EDA tool set may also generate an RTL file of that IP block design for logic synthesis based on the user supplied configuration parameters and implementation technology parameters. As discussed, the RTL file may be a high-level hardware description describing electronic circuits with a collection of registers, Boolean equations, control logic such as "if-then-else" statements, and complex event sequences.

In block 1010, a separate design path in an ASIC or SOC chip design is called the integration stage. The integration of the system of IP blocks may occur in parallel with the generation of the RTL file of the IP block and synthesis scripts for that IP block.

The EDA toolset may provide designs of circuits and logic gates to simulate and verify the operation of the design works correctly. The system designer codes the system of IP blocks to work together. The EDA tool set generates simulations of representations of the circuits described above that can be functionally tested, timing tested, debugged and validated. The EDA tool set simulates the system of IP block's behavior. The system designer verifies and debugs the system of IP blocks' behavior. The EDA tool set tool packages the IP core. A machine-readable storage medium may also store instructions for a test generation program to generate instructions for an external tester and the interconnect to run the test sequences for the tests described herein. One of ordinary skill in the art of electronic design automation knows that a design engineer creates and uses different representations, such as software coded models, to help generating tangible useful information and/or results. Many of these representations can be high-level (abstracted and with less details) or top-down views and can be used to help optimize an electronic design starting from the system level. In addition, a design process usually can be divided into phases and at the end of each phase, a tailor-made representation to the phase is usually generated as output and used as input by the next phase. Skilled engineers can make use of these representations and apply heuristic algorithms to improve the quality of the final results coming out of the final phase. These representations allow the electric design automation world to design circuits, test and verify circuits, derive lithographic mask from Netlists of circuit and other similar useful results.

In block 1015, next, system integration may occur in the integrated circuit design process. Back-end programming generally includes programming of the physical layout of the SOC such as placing and routing, or floor planning, of the circuit elements on the chip layout, as well as the routing of all metal lines between components. The back-end files, such as a layout, physical Library Exchange Format (LEF), etc. are generated for layout and fabrication.

The generated device layout may be integrated with the rest of the layout for the chip. A logic synthesis tool receives synthesis scripts for the IP core and the RTL design file of the IP cores. The logic synthesis tool also receives characteristics of logic gates used in the design from a cell library. RTL code may be generated to instantiate the SOC containing the system of IP blocks. The system of IP blocks with the fixed RTL and synthesis scripts may be simulated and verified. Synthesizing of the design with Register Transfer Level (RTL) may occur. The logic synthesis tool synthesizes the RTL design to create a gate level Netlist circuit design (i.e. a description of the individual transistors and logic gates making up all of the IP sub component blocks). The design may be outputted into a Netlist of one or more hardware design languages (HDL) such as Verilog, VHDL (Very-High-Speed Integrated Circuit Hardware Description Language) or SPICE (Simulation Program for Integrated Circuit Emphasis). A Netlist can also describe the connectivity of an electronic design such as the components included in the design, the attributes of each component and the interconnectivity amongst the components. The EDA tool set facilitates floor planning of components including adding of constraints for component placement in the space available on the chip such as XY coordinates on the chip, and routes metal connections for those components. The EDA tool set provides the information for lithographic masks to be generated from this representation of the IP core to transfer the circuit design onto a chip during manufacture, or other similar useful derivations of the circuits described above. Accordingly, back-end programming may further include the physical verification of the layout to verify that it is physically manufacturable and the resulting SOC will not have any function-preventing physical defects.

In block 1020, a fabrication facility may fabricate one or more chips with the signal generation circuit utilizing the lithographic masks generated from the EDA tool set's circuit design and layout. Fabrication facilities may use a standard CMOS logic process having minimum line widths such as 1.0 um, 0.50 um, 0.35 um, 0.25 um, 0.18 um, 0.13 um, 0.10 um, 90 nm, 65 nm or less, to fabricate the chips. The size of the CMOS logic process employed typically defines the smallest minimum lithographic dimension that can be fabricated on the chip using the lithographic masks, which in turn, determines minimum component size. According to one embodiment, light including X-rays and extreme ultraviolet radiation may pass through these lithographic masks onto the chip to transfer the circuit design and layout for the test circuit onto the chip itself.

The EDA toolset may have configuration dialog plug-ins for the graphical user interface. The EDA toolset may have an RTL generator plug-in for the SocComp. The EDA toolset may have a SystemC generator plug-in for the SocComp. The EDA toolset may perform unit-level verification on components that can be included in RTL simulation. The EDA toolset may have a test validation testbench generator. The EDA toolset may have a dis-assembler for virtual and hardware debug port trace files. The EDA toolset may be compliant with open core protocol standards. The EDA toolset may have Transactor models, Bundle protocol checkers, OCPDis2 to display socket activity, OCPPerf2 to analyze performance of a bundle, as well as other similar programs.

As discussed, an EDA tool set may be implemented in software as a set of data and instructions, such as an Instance in a software library callable to other programs or an EDA tool set consisting of an executable program with the software cell library in one program, stored on a machine-readable medium. A machine-readable storage medium may include any mechanism that provides (e.g., stores and/or transmits) information in a form readable by a machine (e.g., a computer). For example, a machine-readable medium may include, but is not limited to: read only memory (ROM); random access memory (RAM); magnetic disk storage media; optical storage media; flash memory devices; DVD's; EPROMs; EEPROMs; FLASH, magnetic or optical cards; or any other type of media suitable for storing electronic instructions. The instructions and operations also may be practiced in distributed computing environments where the machine-readable media is stored on and/or executed by more than one computer system. In addition, the information transferred between computer systems may either be pulled or pushed across the communication media connecting the computer systems.

Overall the EDA tools examine a traffic profile of the statistical distributions of the range of transactions within the components of the system, such as over the interconnect transaction timings. The graphical user interface of the EDA tool allows a designer to tailor this profile to match the characteristics of the represented processing element. The traffic profile can be created from the designer's knowledge of the behavior of the system component or selected from a number of default settings. The EDA tool monitors and records the traffic behavior and performance data from simulations such an RTL simulation and extracts the statistical properties directly into the traffic profile file. The EDA tool uses time annotated modeling as discussed in U.S. application Ser. No. 11/203,554, titled 'Various methods and apparatuses for time annotated transaction level modeling' Filed: Aug. 11, 2005 and incorporated here by reference to examine the behavior of the transactions on the components in the system, to make the traffic analysis faster than only examining the RTL of the system components that it is representing.

The EDA tools master and slave components generate interconnect transaction requests and responses from the traffic profile and then execute them at the cycle level through a simulator. These transactions include parameters for all relevant timings and payload information. The generation of the timing and payload content of the transaction lends itself particularly well to random generation techniques, based on a statistical profile. The EDA tools tests and verifies the QoS contract for the system and its components latency requirements. These timing and transaction characteristics and, consequently, the QoS contract will vary from one component to another. The operation of the interconnect and other components in the system can be dependent on the latency for each transaction through the system. To meet the contracts between the components of the system, an arbitration policy generally ensures that the QoS contract is met under worst case conditions implying that, for much of the time, each component is getting better transaction performance than it needs. As discussed above, in situations where all contracts are being met and the system may be able to use the spare capacity at components such as the interconnect or memory controller and let some other components in the system use this spare capacity to exceed their target rate. This makes it possible to reduce that target rate later when the system requires more capacity, yet still achieving the QoS within the overall time period. Changes to priority values of transactions and the other mechanisms discussed above can be used to make use of this spare capacity. Thus, for example, the operation of the Quality-of-Service (QoS) in the system is, therefore, the allocation of relative priorities to the transactions in the system. This has the useful effect of allowing components that can use additional capacity to do so if the QoS contracts of all other components are currently being met. The QoS mechanism allows optimizing for efficiency and guaranteeing the performance of the system.

Thus, the machine-readable medium may have data and instructions stored thereon, which, when executed by a machine, cause the machine to generate a representation of the interconnect, other components in the system, or the entire system to check the quality of service within the system. In an embodiment, the machine-readable medium that has data and instructions stored thereon, which, when executed by a machine, cause the machine to generate a representation of at least one or more components in a system to check the quality of service within the system. A request from the initiator is received in the Integrated Circuit in a first time less than or equal to an ordinal number times an arrival interval to satisfy an arrival model. The ordinal number signifies a position of the request among a group of requests. The request from the initiator that has been serviced by a target is returned to the initiator in a second time less than or equal to a constant term plus the ordinal number times a service interval to satisfy a service model. The first and second time is measured to determine whether a Quality of Service (QoS) contract with an initiator in an Integrated Circuit has been satisfied.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In an embodiment, the logic consists of electronic circuits that follow the rules of Boolean Logic, software that contain patterns of instructions, or any combination of both. Various components described above may be implemented in hardware logic, software, or any combination of both.

While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

What is claimed is:

1. A method for satisfying a Quality of Service (QoS) contract with an initiator in an integrated circuit, comprising:

receiving a first request from a group of requests from an initiator according to an arrival model that specifies a first deadline for the first request and additional deadlines for further requests in the group, wherein the deadlines according to the arrival model for each request in the group is a time period less than or equal to an ordinal number times an arrival interval, wherein the ordinal number signifies a positional order of that request within the group, wherein the first deadline set for the first request within the group of request is satisfied when the first request arrives in a first time period of less than or equal to the ordinal number of the first request times the arrival interval;

returning the first request that has been serviced to the initiator according to a service model specifying deadlines in a second period time of less than or equal to a constant term plus the ordinal number times a service interval; and deciding whether the deadlines of the arrival model and the service model have been satisfied in order to satisfy the QoS contract.

2. The method of claim 1, further comprising:
measuring the first and second time periods at a boundary between the initiator and an interconnect.

3. The method of claim 2, further comprising:
satisfying the QoS contract using the initiator, a target, the interconnect, and a QoS unit.

4. The method of claim 1, wherein the service interval is greater than the arrival interval.

5. The method of claim 1, wherein the service interval is equal to the arrival interval.

6. The method of claim 1, further comprising:
determining the constant term specifically for the group of requests.

7. A system for an integrated circuit, comprising:
an interconnect coupled between an initiator and a target, wherein a deadline established by an arrival model is satisfied by the initiator when a first request and the further requests from a group of requests from the same initiator arrive before a first amount of time, which is less than or equal to an ordinal number times an arrival interval, wherein the ordinal number signifies a positional order of the request among a group of requests; and
a logic for the interconnect configured to ensure the initiator satisfies the deadline established by the arrival model; and
wherein the logic ensures a deadline for a service model is satisfied when the request is serviced before a second time less than or equal to a constant term plus the ordinal number times a service interval, where when portions of the system including the logic and interconnect are implemented in software instructions, then the software instructions are stored on a non-transitory computer readable medium in an executable format.

8. The system of claim 7, wherein the service interval is greater than the arrival interval.

9. The system of claim 7, wherein the constant term is determined specifically for the group of requests.

10. The system of claim 7, wherein the logic includes a Quality of Service (QoS) unit to guide the interconnect.

11. The system of claim 10, wherein the QoS unit is coupled between the target and the interconnect.

12. The system of claim 7, wherein the arrival model and the service model comprise a QoS contract.

13. The system of claim 12, wherein the QoS contract is satisfied at a boundary between the initiator and the interconnect.

14. The system of claim 10, wherein the QoS unit is part of the interconnect.

15. The system of claim 10, wherein the QoS unit is part of the target.

16. A method for tracking service of components in an Integrated Circuit, comprising:
maintaining a first allocation count for a first transaction to track whether the first transaction is being serviced by a target in the Integrated Circuit;
establishing an adjustable positive limit having a first value for the first allocation count that establishes an initial maximum amount the first allocation count may go up to;
counting a number of cycles that a given transaction has been waiting when the first transaction has yet to have a request fulfilled from the target during a regular interval of time to guarantee a maximum latency is at least met as required by a Quality of Service contract for a component initiating that transaction; and
using spare capacity in components of the Integrated Circuit system when all QoS contracts are currently being met for the components in the Integrated Circuit system to let some components in the Integrated Circuit system use this spare capacity to exceed their target rate, where the first allocation count is correlateable to establish priority for servicing specific transaction threads.

17. The method of claim 16, further comprising:
raising the adjustable positive limit for the first allocation count to a second value when the first value for the first allocation count has been reached and the first transaction has yet to have a request fulfilled from the target during a regular interval of time;
reducing the adjustable positive limit from the second value to a third value when a second allocation count receives a credit and is positive, wherein the adjustable positive limit is not reduced below the first value;
crediting the first and second allocation count at a regular interval;
debiting the first allocation count when a first thread is serviced; and debiting the second allocation count when a second thread is serviced.

18. The method of claim 16, further comprising:
counting the number of cycles that a given transaction has been waiting to guarantee the maximum latency is at least met as required by their QoS contract, when this number of counted cycles exceeds a limit, the priority of the transaction is in essence promoted to a higher level in the system.

19. The method of claim 17, wherein an allocation count associated with each transaction is initially set to a low adjustable positive limit for that allocation count to achieve a performance defined by the component initiating the transaction's QoS contract and an upper maximum limit is set for allocation count values for each component in the Integrated Circuit to enforce the QoS contract priority throughout the system.

20. The method of claim 17, further comprising:
determining whether the first thread will be serviced according to the first allocation count; and
servicing the first thread instead of the second thread when the second allocation count is less than the first allocation count, wherein the second thread is a high-priority thread and the first thread is a bandwidth-allocation thread.

* * * * *